(12) United States Patent
Pratt et al.

(10) Patent No.: US 8,478,452 B2
(45) Date of Patent: Jul. 2, 2013

(54) GRID REGULATION SERVICES FOR ENERGY STORAGE DEVICES BASED ON GRID FREQUENCY

(75) Inventors: Richard M. Pratt, Richland, WA (US); Donald J. Hammerstrom, West Richland, WA (US); Michael C. W. Kintner-Meyer, Richland, WA (US); Francis K. Tuffner, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 273 days.

(21) Appl. No.: 12/755,260

(22) Filed: Apr. 6, 2010

(65) Prior Publication Data

US 2011/0245987 A1    Oct. 6, 2011

(51) Int. Cl.
*H02J 7/00*    (2006.01)
(52) U.S. Cl.
USPC .......................................... 700/297; 320/128
(58) Field of Classification Search
USPC ..... 700/295, 297, 298; 320/107, 109; 307/46, 307/48, 66
See application file for complete search history.

(56) References Cited

U.S. PATENT DOCUMENTS

| | | | |
|---|---|---|---|
| 2,238,624 | A | 4/1941 | Clark |
| 3,862,430 | A | 1/1975 | Lenhart et al. |
| 4,031,406 | A | 6/1977 | Leyde et al. |
| 4,090,088 | A | 5/1978 | McMahon et al. |
| 4,135,101 | A | 1/1979 | Young et al. |
| 4,213,058 | A | 7/1980 | Townsend |
| 4,309,644 | A | 1/1982 | Reimers et al. |
| 4,317,049 | A | 2/1982 | Schweppe |
| 4,385,241 | A | 5/1983 | Peddie et al. |
| 4,449,178 | A | 5/1984 | Blau, Jr. et al. |
| 4,472,640 | A | 9/1984 | Elmer |
| 4,644,320 | A | 2/1987 | Carr et al. |
| 4,835,706 | A | 5/1989 | Asahi |
| 4,868,412 | A | 9/1989 | Owens |

(Continued)

FOREIGN PATENT DOCUMENTS

| | | |
|---|---|---|
| CA | 2082914 | 1/1996 |
| CA | 2354242 A1 | 12/2002 |

(Continued)

OTHER PUBLICATIONS

International Search Report, PCT/US2011/031237, dated Dec. 20, 2011, 3 pages.

(Continued)

*Primary Examiner* — Ryan Jarrett
(74) *Attorney, Agent, or Firm* — Klarquist Sparkman, LLP

(57) ABSTRACT

Disclosed herein are representative embodiments of methods, apparatus, and systems for charging and discharging an energy storage device connected to an electrical power distribution system. In one exemplary embodiment, a controller monitors electrical characteristics of an electrical power distribution system and provides an output to a bi-directional charger causing the charger to charge or discharge an energy storage device (e.g., a battery in a plug-in hybrid electric vehicle (PHEV)). The controller can help stabilize the electrical power distribution system by increasing the charging rate when there is excess power in the electrical power distribution system (e.g., when the frequency of an AC power grid exceeds an average value), or by discharging power from the energy storage device to stabilize the grid when there is a shortage of power in the electrical power distribution system (e.g., when the frequency of an AC power grid is below an average value).

50 Claims, 19 Drawing Sheets

U.S. PATENT DOCUMENTS

| | | |
|---|---|---|
| 4,916,328 A | 4/1990 | Culp |
| 5,205,318 A | 4/1993 | Massaro et al. |
| 5,220,807 A | 6/1993 | Bourne et al. |
| 5,237,305 A | 8/1993 | Ishikuro et al. |
| 5,436,510 A | 7/1995 | Gilbert |
| 5,442,335 A | 8/1995 | Cantin et al. |
| 5,523,631 A | 6/1996 | Fishman et al. |
| 5,543,667 A | 8/1996 | Shavit et al. |
| 5,544,036 A | 8/1996 | Brown, Jr. et al. |
| 5,548,200 A | 8/1996 | Nor et al. |
| 5,566,085 A | 10/1996 | Marceau et al. |
| 5,625,236 A | 4/1997 | Lefebvre et al. |
| 5,627,759 A | 5/1997 | Bearden et al. |
| 5,638,297 A | 6/1997 | Mansour et al. |
| 5,642,270 A | 6/1997 | Green et al. |
| 5,761,083 A | 6/1998 | Brown, Jr. et al. |
| 5,762,266 A | 6/1998 | Okumura et al. |
| 5,926,004 A | 7/1999 | Henze |
| 5,927,598 A | 7/1999 | Broe |
| 5,942,026 A | 8/1999 | Erlichman et al. |
| 5,956,462 A | 9/1999 | Langford |
| 5,959,368 A | 9/1999 | Kubo et al. |
| 6,046,513 A | 4/2000 | Jouper et al. |
| 6,067,482 A | 5/2000 | Shapiro |
| 6,157,008 A | 12/2000 | Brown et al. |
| 6,219,623 B1 | 4/2001 | Wills |
| 6,269,274 B1 | 7/2001 | Steinman et al. |
| 6,278,909 B1 | 8/2001 | Thibeault et al. |
| 6,314,378 B1 | 11/2001 | Hodge et al. |
| 6,348,777 B1 | 2/2002 | Brown et al. |
| 6,367,023 B2 | 4/2002 | Kling et al. |
| 6,429,546 B1 | 8/2002 | Ropp et al. |
| 6,476,521 B1 | 11/2002 | Lof et al. |
| 6,477,063 B2 | 11/2002 | Ishii et al. |
| 6,487,509 B1 | 11/2002 | Aisa |
| 6,490,141 B2 | 12/2002 | Fischer et al. |
| 6,493,643 B1 | 12/2002 | Aisa |
| 6,553,418 B1 | 4/2003 | Collins et al. |
| 6,618,649 B1 | 9/2003 | Shilo |
| 6,624,532 B1 | 9/2003 | Davidow et al. |
| 6,633,823 B2 | 10/2003 | Bartone et al. |
| 6,671,586 B2 | 12/2003 | Davis et al. |
| 6,772,052 B1 | 8/2004 | Amundsen et al. |
| 6,832,135 B2 | 12/2004 | Ying |
| 6,861,956 B2 | 3/2005 | Ying |
| 6,862,498 B2 | 3/2005 | Davis et al. |
| 6,937,945 B2 | 8/2005 | Golder et al. |
| 7,010,363 B2 | 3/2006 | Donnelly et al. |
| 7,036,028 B2 | 4/2006 | Zalesski |
| 7,069,117 B2 | 6/2006 | Wilson et al. |
| 7,135,956 B2 | 11/2006 | Bartone et al. |
| 7,149,605 B2 | 12/2006 | Chassin et al. |
| 7,242,114 B1 | 7/2007 | Cannon et al. |
| 7,309,966 B2 | 12/2007 | Wobben |
| 7,420,293 B2 | 9/2008 | Donnelly et al. |
| 7,541,757 B2 | 6/2009 | Wobben |
| 7,595,567 B1 | 9/2009 | Cannon et al. |
| 7,777,434 B2 | 8/2010 | Wobben |
| 2002/0072868 A1 | 6/2002 | Bartone et al. |
| 2002/0162032 A1 | 10/2002 | Gundersen et al. |
| 2002/0192519 A1 | 12/2002 | Fujita et al. |
| 2003/0050737 A1 | 3/2003 | Osann |
| 2003/0078271 A1 | 4/2003 | Kanbara et al. |
| 2003/0233201 A1 | 12/2003 | Horst et al. |
| 2004/0078153 A1 | 4/2004 | Bartone et al. |
| 2004/0095237 A1 | 5/2004 | Chen et al. |
| 2004/0117680 A1 | 6/2004 | Naffziger |
| 2004/0186671 A1 | 9/2004 | Golder et al. |
| 2004/0190211 A1 | 9/2004 | Ockert et al. |
| 2004/0254688 A1 | 12/2004 | Chassin et al. |
| 2005/0077867 A1 | 4/2005 | Cawthorne et al. |
| 2005/0120492 A1 | 6/2005 | Koo et al. |
| 2005/0122652 A1 | 6/2005 | Richardson et al. |
| 2005/0154499 A1 | 7/2005 | Aldridge |
| 2006/0028178 A1 | 2/2006 | Hobbs |
| 2006/0229768 A1 | 10/2006 | Chassin et al. |
| 2006/0244411 A1 | 11/2006 | Wobben |
| 2007/0100506 A1 | 5/2007 | Teichmann |
| 2007/0282495 A1 | 12/2007 | Kempton et al. |
| 2008/0052145 A1 | 2/2008 | Kaplan et al. |
| 2008/0079374 A1 | 4/2008 | Wobben |
| 2008/0114499 A1 | 5/2008 | Hakim et al. |
| 2008/0197808 A1* | 8/2008 | Banta et al. ............... 320/134 |
| 2008/0218121 A1 | 9/2008 | Gale et al. |
| 2008/0306637 A1* | 12/2008 | Borumand et al. ............... 701/3 |
| 2009/0206779 A1 | 8/2009 | Wobben |
| 2009/0295162 A1 | 12/2009 | Oohara et al. |
| 2010/0017249 A1 | 1/2010 | Fincham et al. |
| 2010/0090532 A1* | 4/2010 | Shelton et al. ............... 307/46 |
| 2010/0156348 A1 | 6/2010 | Kirchner |
| 2010/0174667 A1* | 7/2010 | Vitale et al. ............... 705/412 |
| 2010/0179707 A1 | 7/2010 | Cannon et al. |
| 2010/0231045 A1* | 9/2010 | Collins et al. ............... 307/47 |
| 2010/0289451 A1 | 11/2010 | Tuffner et al. |
| 2010/0314942 A1* | 12/2010 | Talkin et al. ............... 307/41 |
| 2011/0121791 A1* | 5/2011 | Basham et al. ............... 320/162 |
| 2011/0190958 A1* | 8/2011 | Hirst ............... 700/295 |

FOREIGN PATENT DOCUMENTS

| | | |
|---|---|---|
| EP | 0 372 961 A3 | 6/1990 |
| EP | 0 597 322 A3 | 5/1994 |
| EP | 1372238 | 12/2003 |
| GB | 2080640 A | 2/1982 |
| GB | 2361118 A | 10/2001 |
| GB | 2361118 B | 5/2002 |
| JP | 57-049332 | 3/1982 |
| JP | 03-503833 | 8/1991 |
| JP | 09-074674 | 3/1997 |
| JP | 10-009640 | 1/1998 |
| JP | 2003-149272 | 5/2003 |
| WO | WO 89/08342 | 9/1989 |
| WO | WO 99/52194 | 10/1999 |
| WO | WO 01/01542 A1 | 1/2001 |
| WO | WO 02/07365 A2 | 1/2002 |
| WO | WO 02/069471 A1 | 9/2002 |
| WO | WO 03/001645 A2 | 1/2003 |
| WO | WO 03/001645 A3 | 1/2003 |
| WO | WO 03/008983 A2 | 1/2003 |
| WO | WO 2004/114495 | 12/2004 |
| WO | WO 2004/114496 | 12/2004 |
| WO | WO2005/009779 | 2/2005 |
| WO | WO 2007/104167 A1 | 9/2007 |
| WO | WO 2010/132495 | 11/2010 |
| WO | WO 2011/127047 A2 | 10/2011 |

OTHER PUBLICATIONS

Written Opinion of the International Searching Authority, PCT/US2011/031237, dated Dec. 20, 2011, 6 pages.

Non-final Office Action, U.S. Appl. No. 12/467,192, dated Jul. 18, 2011, 27 pages.

Response to Jul. 18, 2011 Office Action, U.S. Appl. No. 12/467,192, dated Nov. 18, 2011, 23 pages.

Notice of Allowance, U.S. Appl. No. 12/467,192, dated Dec. 1, 2011, 5 pages.

U.S. Appl. No. 60/450,417, filed Sep. 2004, Ockert et al.

U.S. Appl. No. 60/485,435, filed Sep. 2004, Cannon et al.

U.S. Appl. No. 60/496,532, filed Sep. 2004, Wallace et al.

"Considerations for load as a virtual generator for grid security," Kehler, J.H., IEEE *Power Engineering Society General Meeting 2003*, vol. 4, Jul. 2003, pp. 2289-2292.

"Delivering Valuable Distributed Power Resources," Apr. 13, 2009, www.v2green.com/solutions/delivering-valuable-distributed-power-resources, 1 page.

"Demand side response 21st century style," Covino, S., *IEEE Power Engineering Society General Meeting*, 2003, vol. 4, Jul. 2003, pp. 2280-2284.

"Demand Response—Direct Control," http://www.cannontech.com/products/drdirectcontrol.asp, Nov. 19, 2003, 3 pages.

"Demand Response—Direct Control," http://www.cannontech.com/products/drdirectcontrol.asp, Mar. 19, 2004, 3 pages.

"Distribution Automation," http://www.dt2003.events.pennet.com/confrence_program.cfm, Feb. 2-4, 2003, 20 pages.

"End-Use Load Control for Power System Dynamic Stability Enhancement," Dagle et al., U.S. Dept. of Energy, Contract DE-AC06-76RLO 1830, PNNL-11488 US-221, Feb. 1997, 52 pages.

"ExpressStat Programmable Demand Response Thermostat," http://www.honeywellcannon.com/Products/ExpressStat.html, Jun. 23, 2003, 2 pages.

"Fast load shedding for angle stability control," Rovnyak, et al., Power Engineering Society General Meeting, 2003, IEEE, vol. 4, Jul. 2003, pp. 2275-2279.

"Load response and system reliability situations," Burke et al., *IEEE Power Engineering Society General Meeting 2003*, vol. 4, Jul. 2003, pp. 2285-2288.

"LCR 5000," http://www.honeywellcannon.com/Products/LCR5000.html, May 23, 2003, 3 pages.

"Mass Market Pay-for-Performance Demand Response—Price-Based DR Programs with No Interval Metering Required," Backer, Doug, EnergyPulse.net, Feb. 18, 2003, 3 pages.

"Mass Market Pay-for-Performance Incentive Plan," Cannon Technologies, Mar. 19, 2004, pp. 1-10.

"News & Events—Papers & Panels," http://cannontech.com/news/papers.asp, Mar. 18, 2004, 3 pages.

"Passive vs. Active Demand Response in Today's Marketplace," Douglas Backer, Cannon Technologies, Inc., Feb. 4, 2003, 7 pages.

"Pay-For-Performance," http://www.honeywellcannon.com/Designs/Pay-for-Performance.asp, Mar. 19, 2004, 3 pages.

"Power Market Dynamics: The Statistical Mechanics of Transaction-Based Control," D.P. Chasin, Pacific Northwest National Laboratory, Jun. 30-Jul. 2, 2003, pp. 573-582.

"QuiQ-High-Efficiency Grid-Friendly Battery Charger," Cameron et al., Nov. 2003, 4 pages.

"Smart Load Control and Grid-Friendly Appliances," Kintner-Meyer, Program Advisory Committee (PAC) of the project and CEC staff on Oct. 23, 2001, 7 pages.

"Standard BAL-005-0b-Automatic Generation Control," http://www.nerc.com/files/BAL-005-0b.pdf, May 2, 2007, 7 pages.

"Statistical Mechanics: A Possible Model for Market-based Electric Power Control," D.P. Chasin, Pacific Northwest National Laboratory, Jan. 2004, pp. 1-10.

"The status of demand response in New York," Lawrence, D.J., Neenan, B.F., IEEE Power Engineering Society General Meeting 2003, vol. 4, Jul. 2003, pp. 2270-2274.

"SuperStat," http://www.comverge-tech.com/sustat.html, 2002, 1 page.

"What is Energy Star?", http://www.energystar.gov/index.cfm?c=about.ab_index.html, Apr. 16, 2003, 2 pages.

"What is TWACS," http://www.twacs.com, Jun. 23, 2003, 2 pages.

"The Yukon System," http://www.honeywellcannon.com/products/Yukon.html, Jun. 23, 2003, 7 pages.

"AC Propulsion's Reductive™ Charger," downloaded from the Internet on Mar. 9, 2010, 3 pages.

"Automatic Generation Control," Standard BAL-005-0.1b, NERC Board of Trustees, May 13, 2009, 5 pages.

Anonymous, "AC Propulsion," downloaded from the Internet at http://www.acpropulsion.com/acp_v2g_whitepaper.pdf on Mar. 9, 2010, 3 pages.

Gage et al., "Final Report—Development and Evaluation of a Plug-in HEV with Vehicle-to-Grid Power Flow," AC Propulsion, Inc., Dec. 17, 2003, 52 pages.

Kintner-Meyer, "Smart Charger Technology for Customer Convenience and Grid Reliability," EVS 24, Stavanger, Norway, May 15, 2009, 15 pages.

PCT/US2010/034438 International Search Report dated Nov. 9, 2010, 3 pages.

PCT/US2010/034438 Written Opinion dated Nov. 9, 2010, 6 pages.

PCT/US2010/034438 International Preliminary Report on Patentability dated Nov. 15, 2011, 6 pages.

U.S. Appl. No. 12/467,192, Notice of Allowance dated Mar. 12, 2012, 7 pages.

U.S. Appl. No. 12/467,192, Request for Continued Examination and Amendment filed Mar. 1, 2012, 19 pages.

"Vehicle-to-grid V2G," http://en.wikipedia.org/wiki/Vehicle-to-grid, downloaded on Apr. 5, 2012, 6 pages.

Brooks et al., "Integration of Electric Drive Vehicles with the Electric Power Grid—a New Value Stream," 15 pp. (also published as Brooks et al., "Integration of Electric Drive Vehicles with the Electric Power Grid—a New Value Stream," *The 18th International Battery, Hybrid and Fuel Cell Electric Vehicle Symposium and Exhibition* (EVS 18 Berlin) (2001)).

Brooks et al., "PG&E and Tesla Motors: Vehicle to Grid Demonstration and Evaluation Program," 10 pp. (also published as Brooks et al., "PG&E and Tesla Motors: Vehicle to Grid Demonstration and Evaluation Program," *The 23rd International Battery, Hybrid and Fuel Cell Electric Vehicle Symposium and Exhibition* (EVS 23 Anaheim) (2007)).

International Preliminary Report on Patentability, PCT/US2011/031237, dated Oct. 9, 2012, 7 pages.

Non-final Office Action, U.S. Appl. No. 13/443,620, dated Nov. 8, 2012, 23 pages.

U.S. Appl. No. 12/467,192, Amendment filed Mar. 1, 2012, 18 pages.

\* cited by examiner

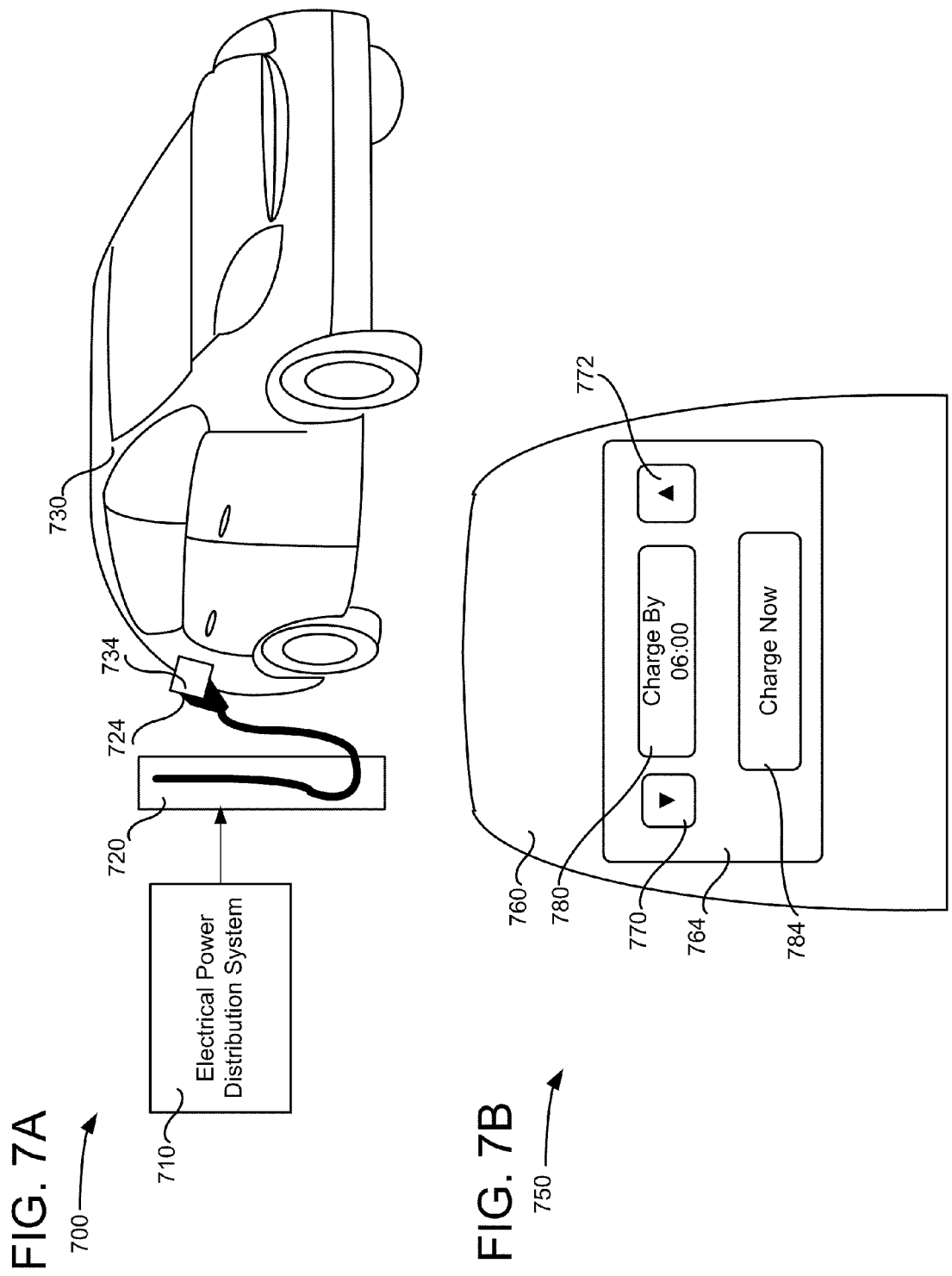

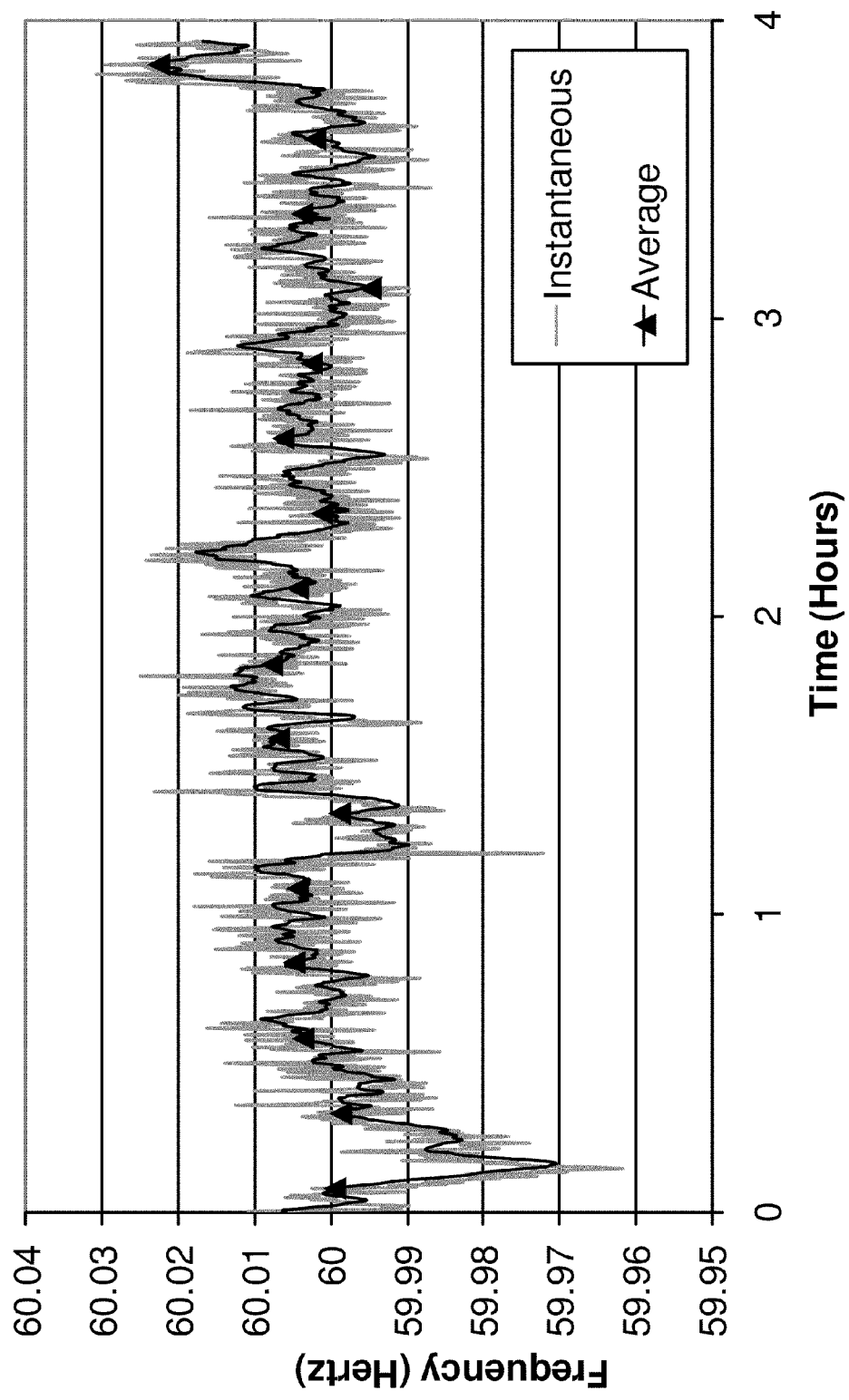

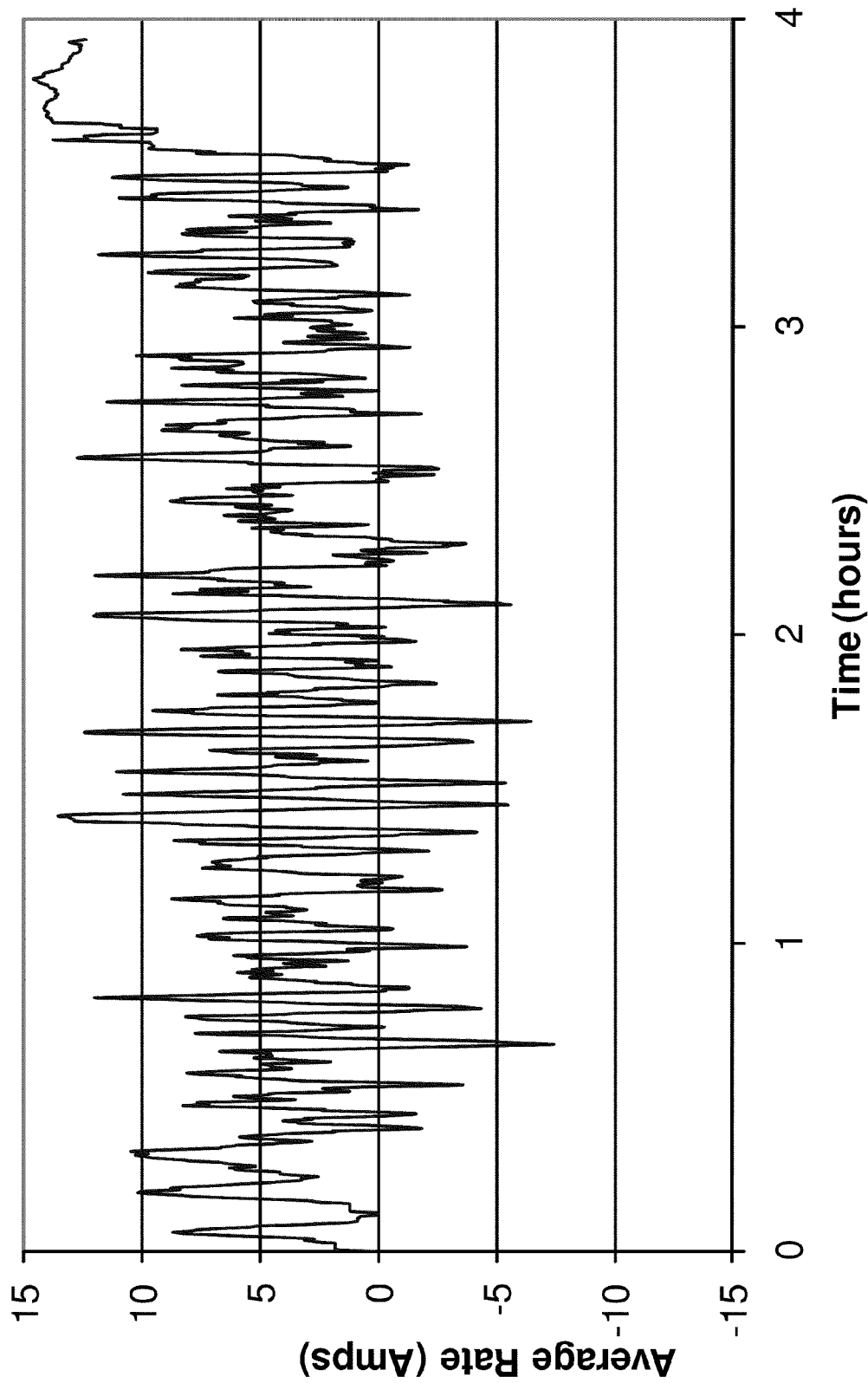

GRID REGULATION SERVICES FOR ENERGY STORAGE DEVICES BASED ON GRID FREQUENCY

GOVERNMENT RIGHTS STATEMENT

This invention was made with Government support under contract number DE-AC05-76RL01830 awarded by the U.S. Department of Energy. The Government has certain rights in the invention.

COMPUTER PROGRAM LISTING APPENDIX

Reference is made to the computer program listings submitted herewith via EFS. A single file is included with this EFS submission that is entitled "appendix.txt," an ASCII text file that was created on Mar. 23, 2010, and has a size of 12,461 bytes. The material contained in the appendix.txt file is hereby incorporated by reference herein.

FIELD

This disclosure relates to power grid regulation, battery charging control methods, electric vehicle charging systems, battery charging apparatus, and rechargeable battery systems.

BACKGROUND

An electric power grid (or electrical power distribution system) requires the energy input of the system to match the energy output of the system. To balance this energy requirement and maintain grid stability, regulation services are used. These regulation services are often provided by adjusting the output of generators to meet the energy demand. Loads on the electrical power distribution system can also be adjusted to use more or less energy to meet this demand. Furthermore, in "off-grid" or micro-grid situations, where a relatively small system is supported by renewable generation sources, such as wind or solar, regulation services can provide balancing capabilities to help ensure stability even at a small scale.

With the further increase of intermittent renewable resources, more regulation services will be required to offset variability in power generation. Accordingly, there exists a need for improved methods, systems, and apparatus for providing reliable, low-cost regulation services.

SUMMARY

Exemplary embodiments of the disclosed technology provide a form of "regulation up and down services" to the electric power grid using an energy storage device. The energy storage device can be, but is not limited to, an energy storage device in an electric vehicle or plug-in hybrid electric vehicle (PHEV), or a stationary energy storage device such as a battery or a photovoltaic system including a battery. The regulation services allow an energy storage device to vary its contribution to the power grid between a full discharge (generation) state and a full charge (consumption) state. The basis for this regulation can include, for example, frequency measurements of an alternating current (AC) power supply. For instance, the actual amount of load present on the system can be adjusted using a regulation signal and information about any constraints imposed upon the load device (such as a desired finish time or maximum device capacity).

In certain embodiments of the disclosed technology, a controller uses the grid AC frequency as a direct regulation signal or as the basis for a regulation signal for operating an energy storage system. By regulating the energy in or out of an energy storage system using a measured signal rather than a central control signal, the energy storage system can effectively become integrated into the electric power grid with very low infrastructure requirements. Thus, the energy storage system output can be controlled directly by conditions of the grid itself, rather than from a central aggregating authority or utility. Consequently, the energy storage system does not require communications from the grid operator. Energy storage systems implementing embodiments of the disclosed technology will not only provide a benefit to the overall health of the power grid, but will do so in a cost-efficient manner by eliminating the need for a central aggregator and the communication requirements that such an aggregator would require. Furthermore, the ability to provide regulated power back into the power grid can help stabilize the power grid. Rather than simply turning an energy storage device off during low frequency periods, the energy storage device can inject energy back into the power grid. This can help mitigate the lack of generation elsewhere in the system and prevent the system from moving further into an unbalanced condition.

One exemplary embodiment disclosed herein is a method that comprises receiving data representing one or more electrical characteristics of an electrical power distribution system, selecting a charging rate for a bi-directional charging system based on the data, the bi-directional charging system being operable to charge or discharge an energy storage device, and generating a regulation signal for causing the bi-directional charging system to discharge the energy storage device, the regulation signal being based at least in part on the selected charging rate. In some examples, the received data includes frequency data representing an instantaneous frequency measurement of the electrical power distribution system. In some examples, the method further comprises generating a regulation signal for causing the bi-directional charging system to charge the energy storage device, the regulation signal being based at least in part on the selected charging rate. In some examples, the selecting is based at least in part on an actual charging or discharging rate of the energy storage device. Feasible energy storage devices include electric vehicles, plug-in hybrid electric vehicles, stationary power sources, pumped water storage, flywheels, and battery-supplemented photovoltaic power systems. Examples of the bi-directional charging system include AC-to-DC battery chargers coupled with a DC-to-AC grid-tie inverter.

Another exemplary embodiment disclosed herein is one or more computer-readable storage media storing computer-readable instructions that when executed by a computer cause the computer to perform a method comprising receiving data representing one or more electrical characteristics of an electrical power distribution system, selecting a charging rate for a bi-directional charging system based on the data, the bi-directional charging system being operable to discharge an energy storage device to the electrical power distribution system, and generating a regulation signal for causing the bi-directional charging system to discharge the energy storage device, the regulation signal being based at least in part on the selected charging rate. In some examples, the data includes frequency data representing an instantaneous frequency of the electrical power distribution system. In some examples the selecting comprises computing a difference between the instantaneous frequency and an average of previously received instantaneous frequency data.

A further exemplary embodiment disclosed herein is a system comprising one or more processing units, one or more computer-readable storage media that store computer-readable instructions that when executed by the processing units determine a charging rate for a bi-directional charger using: a data input module operable to receive data representing one or more electrical characteristics of an electrical power distribution system, a logic module operable to determine the charging rate for the bi-directional charger using the data, and a data output module operable to send charger output rate data representing the determined charging rate. In some examples, the data includes frequency data representing an instantaneous frequency of the electrical power distribution system. In some examples, the charging rate of the bi-directional charger can indicate that the bi-directional charger is to discharge, or to charge. In some examples, the system includes a bi-directional charger configured to receive power from or deliver power to the electrical power distribution system in response to the charger output rate data. In some examples, the system includes an energy storage device operable to generate power in the electrical power distribution system responsive to the charger output rate data.

Another exemplary embodiment disclosed herein is a method that comprises transmitting electrical power from an electrical power distribution system to energy storage devices and receiving electrical power at the electrical power distribution system from one or more of the energy storage devices in response to a measured instantaneous frequency of the electrical power distribution system, wherein the one or more energy storage devices transmit power to the electrical power distribution system in response to a deviation of the measured instantaneous frequency of the electrical power distribution system from an average frequency of the electrical power distribution system. In some examples, the method further comprises providing a regulation signal causing the energy storage devices to transmit the power to the electrical power distribution system wherein the providing is performed by an electric vehicle charging station.

A further exemplary embodiment disclosed herein is a method that comprises monitoring a frequency of an electrical power distribution system, and when the frequency of the electrical power distribution system is in a first frequency range, receiving power from the electrical power distribution system and charging an energy storage device at a charging rate with the received power, and when the frequency of the electrical power distribution system is in a second frequency range different from the first frequency range, discharging the energy storage device at a discharging rate and delivering power from the energy storage device to the electrical power distribution system.

Another exemplary embodiment disclosed herein is a system that comprises data input means operable to receive data representing one or more electrical characteristics of an electrical power distribution system logic means operable to determine the charging rate for a bi-directional charger using the data, and data output module operable to send charger output rate data representing the determined charging rate. In some examples, the system further comprises a bi-directional charger coupled with the data output module. In some examples, the system further comprises energy storage means coupled to the bi-directional charger.

The foregoing and other objects, features, and advantages of the invention will become more apparent from the following detailed description, which proceeds with reference to the accompanying figures.

BRIEF DESCRIPTION OF THE DRAWINGS

FIG. 7A depicts an exemplary PHEV implementing aspects of the disclosed technology.

FIG. 7B depicts an exemplary user interface for a controller in the PHEV of FIG. 7A.

FIG. 11C is a graph showing instantaneous frequency and average frequency vs. time for an embodiment of the disclosed technology.

FIG. 11G is a graph showing average charging rate vs. time for an embodiment of the disclosed technology.

DETAILED DESCRIPTION

I. General Considerations

Figure 1:
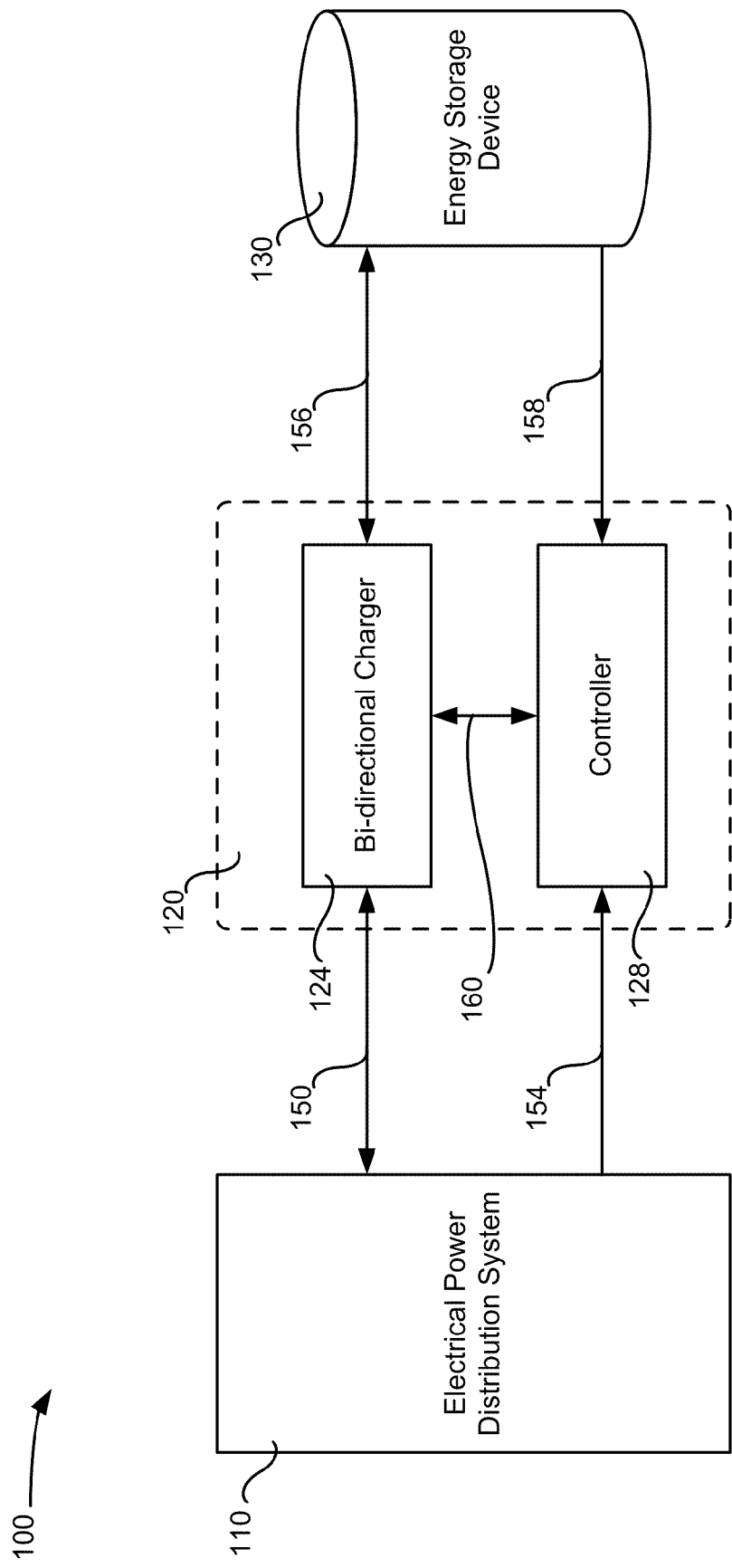
FIG. 1 is a schematic block diagram depicting an exemplary controller and bi-directional charger in accordance with the disclosed technology. The illustrated controller and bi-directional charger are connected to an electrical power distribution system and an energy storage device.

Disclosed below are representative embodiments of methods, apparatus, and systems for controlling bi-directional energy storage device chargers. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other things and methods. Additionally, the description sometimes uses terms like "produce," "generate," "select," "receive," and "provide" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Moreover, unless the context dictates otherwise, the term "coupled" means mechanically, electrically, or electromagnetically connected or linked and includes both direct connections or direct links and indirect connections or indirect links through one or more intermediate elements not affecting the intended operation of the described system. Additionally, certain terms may be used such as "up," "down," "upper," "lower," and the like. These terms are used, where applicable, to provide some clarity of description when dealing with relative relationships. But, these terms are not intended to imply absolute relationships, positions, and/or orientations. Furthermore, as used in this disclosure, the terms "charge" or "charging" may be used to describe the action a device takes when it transmits energy or electrical power to an energy storage device. The terms "discharge" or "discharging" may be used to describe the action a device takes when it transmits energy or electrical power from an energy storage device. However, the terms "charge," "charging," "discharge," and "discharging" should not be construed as limiting the device to only a particular type or direction of energy or electrical power transmittal.

Figure 10:
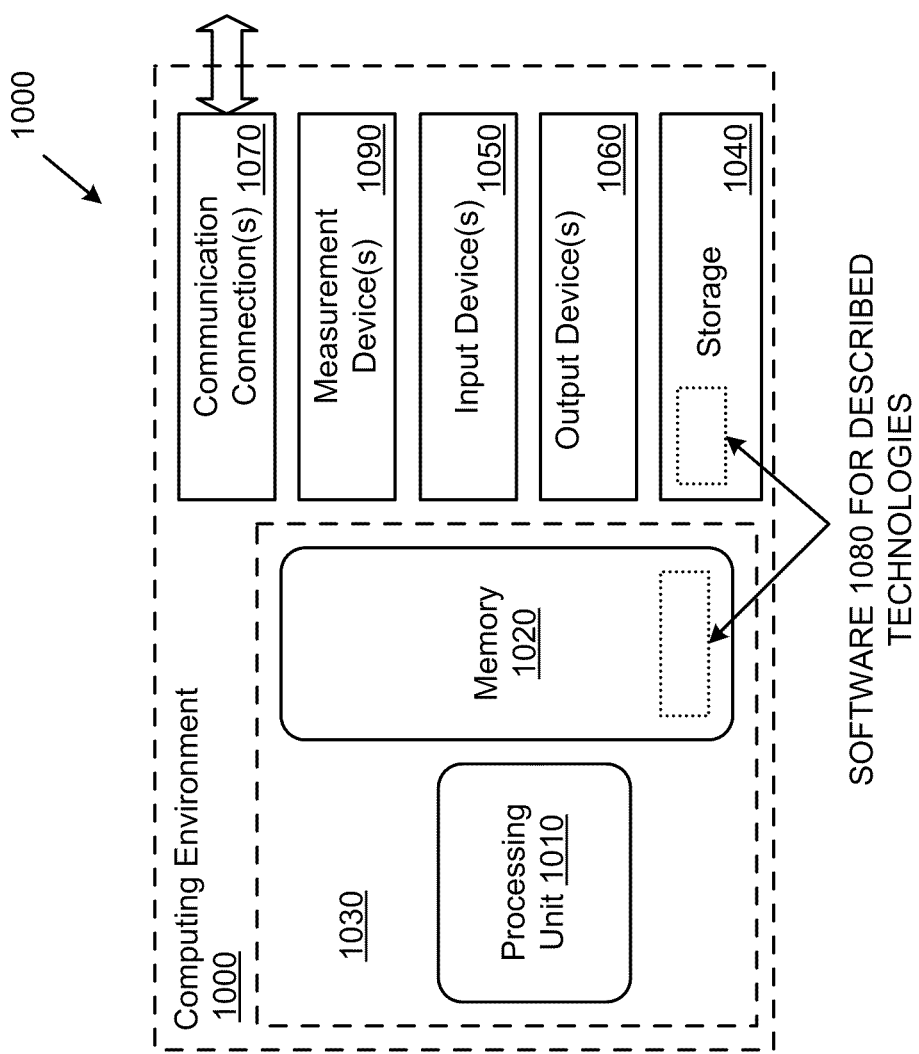
FIG. 10 is a schematic block diagram illustrating a general computing environment suitable for implementing embodiments of the disclosed technology.

FIG. 10 illustrates a generalized example of a suitable computing environment 1000 in which embodiments of the disclosed technology can be implemented. For example, the controllers illustrated in FIGS. 1, 2, 3, 7, and 8 and the methods shown in FIGS. 4, 5, and 6 can be implemented in whole or in part using the computing hardware illustrated in computing environment 1000.

The computing environment 1000 is not intended to suggest any limitation as to the scope of use or functionality of the technology, as the technology can be implemented in diverse general-purpose or special-purpose computing environments. For example, the disclosed technology can be implemented using other computing system configurations, including multiprocessor systems, microprocessor-based or programmable electronics, network PCs, minicomputers, mainframe computers, programmable logic devices (such as field-programmable logic devices), application specific integrated circuits, and the like. Embodiments of the disclosed technology can also be practiced in distributed computing environments where tasks are performed by remote processing devices that are linked through a communications network. In a distributed computing environment, program modules may be located in both local and remote memory storage devices.

With reference to FIG. 10, the computing environment 1000 includes at least one central processing unit 1010 and memory 1020. In FIG. 10, this most basic configuration 1030 is included within a dashed line. The central processing unit 1010 executes computer-executable instructions and may be a real or a virtual processor. In a multi-processing system, multiple processing units execute computer-executable instructions to increase processing power. The memory 1020 can be volatile memory (e.g., registers, cache, RAM), non-volatile memory (e.g., ROM, EEPROM, flash memory, etc.), or some combination of the two. The memory 1020 can store software 1080, which can implement any of the technologies described herein.

The computing environment 1000 can have additional features. For example, the computing environment 1000 includes storage 1040, one or more input devices 1050, one or more output devices 1060, one or more communication connections 1070, and one or more measurement devices 1090. An interconnection mechanism (not shown) such as a bus, a controller, or a network, interconnects the components of the computing environment 1000. Typically, operating system software (not shown) provides an operating environment for other software executing in the computing environment 1000, and coordinates activities of the components of the computing environment 1000.

The storage 1040 can be removable or non-removable, and includes magnetic disks, magnetic tapes or cassettes, CD-ROMs, CD-RWs, DVDs, or any other such non-transitory computer-readable medium that can be used to store information and that can be accessed within the computing environment 1000. The storage 1040 can store the software 1080, which can implement any of the technologies described herein.

As should be readily understood, the term computer-readable storage media includes non-transitory computer-readable media or devices for data storage such as memory 1020 and storage 1040, not transitory media carrying a temporary signal. As noted, such computer-readable storage media can store computer-executable instruction which when executed by a computer caused the computer to perform any of the methods described herein. The input device(s) 1050 can be a touch input device, such as a keyboard, keypad, mouse, pen, or trackball, a voice input device, a scanning device, or another device, that provides input to the computing environment 1000. For audio, the input device(s) 1050 can be a sound card or similar device that accepts audio input in analog or digital form, or a CD-ROM reader that provides audio samples to the computing environment 1000. The output device(s) 1060 can be a display, printer, speaker, CD-writer, or another device that provides output from the computing environment 1000. The measurement device 1090 can act as an input device (e.g., a device for converting measured electrical characteristics into measured data) and/or as an output device (e.g., a device for transmitting the measured data to the processing unit).

The communication connection(s) 1070 enable communication over a communication medium (e.g., a connecting network) to another computing entity. The communication medium can be used to convey information, such as computer-executable instructions, data associated with the electrical characteristics of the electrical power distribution system, data associated with the energy storage device, or other intermediate or final data.

II. Introduction to the Disclosed Technology

Many common storage loads, such as pumped water storage or battery-based systems, represent a noticeable percentage of loads on the power grid. Furthermore, these devices are often discretely controlled, typically with only a full-on or full-off state. Additionally, these loads frequently have relaxed time constraints for charging. For example, a vehicle charging may only need 4 hours to fully charge but will not be needed for another 8 hours. As such, the amount of loading to which the device subjects the power grid can be adjusted in response to varying conditions on the power grid, thus providing a service to the power system rather than presenting a hindrance. By varying the amount of the load proportionally, a population of loads can provide regulation services to the power grid while still meeting operating constraints for the loads. By using electrical characteristics of the power grid (for example, frequency, voltage, or phase) as a regulation signal or as the basis for a regulation signal, the variation of the amount of load can be used to increase and decrease the effective loading on the power system and help meet the energy balance requirement. Furthermore, in periods of high demand, such regulated loads can be controlled to draw less power or even provide power back into the power grid, therefore resulting in less strain on the electric power grid.

Certain embodiments of the disclosed technology include methods, systems, and apparatus for providing a form of regulation up and down services to the electric power grid using a load whose overall operation will not be hindered if the power supplied to the load varies in a charging and discharging sense. The regulation allows the energy storage device to vary its contribution to the power grid between a full discharge (generation) state and a full charge (consumption) state. The basis for this regulation can come, for example, from frequency measurements of the alternating current (AC) power supply as delivered to an outlet (e.g., a power outlet in a home or building or a power outlet at an electric vehicle charging station). The actual amount of load or generation the end device presents to the system can be adjusted using this regulation signal and information about any constraints imposed upon the load device (such as a desired finish time or maximum capacity).

Certain embodiments of the disclosed technology enable grid loads and energy storage devices to vary their consumption (loads) or energy supplied (sources) as a function of the grid frequency. The variation in grid frequency is primarily related to a variation in real loads on the grid. Therefore, if grid loads or energy source outputs can be adjusted as a function of grid frequency, the grid is inherently more stable. In one exemplary embodiment, grid frequency is used as the basis for a regulation signal used to control the grid load or energy source. Using device specific constraints, the grid frequency signal can be translated or conditioned into a signal that regulates the load to between, for example, 0% and 100% of the rated power into the device as well as to between 0% and −100% of the rated power as a discharge load from the device. The grid frequency information can be obtained through direct measurement from an embedded device executing computer-readable instructions or from an external measurement source such as a "smart meter" (for example, an advanced meter infrastructure (AMI) smart meter). Additional details with respect to methods of monitoring the frequency of the electrical grid that can be used in embodiments of the disclosed technology are described in U.S. Pat. No. 7,149,605, entitled "Electrical Power Distribution Control Methods, Electrical Energy Demand Monitoring Methods, and Power Management devices," the teachings of which are hereby incorporated herein by reference.

A first exemplary signal conditioning parameter that can be used relates to the measured grid frequency signal (instantaneous frequency) itself. The measured grid frequency signal can be used to reduce wear and tear on the load, as well as to closely match existing automatic generator control (AGC) signals provided to larger regulation sources (such as load-balancing generators). If the measurement data is obtained at a higher sample rate than the typical AGC signal (e.g., at a rate of 4 seconds or less), a scheme can be employed to reduce the data down to a desired sample rate for providing an AGC signal.

A second exemplary signal conditioning parameter that can be used relates to the average frequency of the electric power grid. In order to provide a regulation services component, the deviation of the instantaneous frequency from the average frequency can be determined. If the data representing average frequency is provided externally, no further processing is required. If the average frequency is directly obtained from the measured frequency data, a sliding-window average can be used to determine the average frequency. The average can be computed through the methods described below, or by using other suitable methods known to one of ordinary skill in the art.

In one exemplary embodiment, the average frequency information is obtained from direct measurements using a recursive implementation of a finite-impulse response (FIR) filter. The FIR filter can compute the average frequency for a predetermined number of samples. The length of the average can be determined through additional knowledge of grid performance to make a determination of how long of an average is reasonable. In some embodiments, additional logic can be applied to the FIR filter average. For example, the FIR filter can be re-initialized under conditions where the grid frequency has deviated significantly under or over the average value. In other embodiments, other appropriate analog or digital filters can be used (for example, a PID filter).

The regulation signal can be determined using the average frequency data and the instantaneous frequency data. In one embodiment, for example, the difference between the measured frequency and the average frequency is determined. If the measured frequency is higher than the average (e.g., 60.1 Hz vs. an average of 59.95 Hz), a regulation up signal is obtained. If the measured frequency is lower than average, a regulation down signal is obtained. This regulation signal can be scaled to adhere to a −1.0 to 1.0 range, where −1.0 represents a full discharging state (maximum down regulation) and 1.0 represents a full charging state (maximum up regulation). Under this generic scaling format, the average frequency represents a biased regulation value of approximately 0.5 to accommodate a charging-centered operation. However, if a neutral capacity state is desired, the average frequency could represent a regulation value of 0.0 (resulting in approximately equal amounts of charging and discharging).

The actual frequency difference can be normalized to restrict the regulation signal to the −1.0 to 1.0 range. A first exemplary normalization technique uses a fixed frequency interval, where fixed values for the upper and lower frequency deviation are predefined. For example, in an ideal 60 Hz system the regulation signal may be scaled for a range of +/−0.1 Hz, or 59.9 and 60.1 Hz respectively. The frequency deviation range can be defined by the managing utility or consortium of the electric power grid. However, in some embodiments employing this technique, the regulation signal may not be realized across its full range.

A second exemplary normalization technique uses a measured local minimum and local maximum of the frequency data. The "locality" of the local minimum/maximum extremes is restricted to a relatively short time period (for example, on the order of minutes or seconds). Using this second technique, the regulation signal can vary from −1.0 to +1.0, thereby providing a greater regulation signal range over the first technique of normalization described above.

According to one exemplary embodiment, the amount of load an energy storage device draws can be determined using a regulation signal obtained from data representing power grid frequency information. The range of values for the regulation up and down signals can be increased by spreading the range of charging between a maximum level of power generation (discharge) and a maximum level of power consumption capacity (charge) available (e.g., −100% to 100%). Under normal operating conditions, the regulation signal can be used to vary the power transmitted into an energy storage device from a full discharge level to a full charge level. However, the regulation signal can also be subject to constraints, which can be monitored and used to modify the regulation signal before applying the output regulation signal to the energy storage device (load).

A first exemplary constraint that can be used relates to the safety of a connected energy storage device. For example, when the energy storage device is a battery storage system, consistently falling below a certain level of state-of-charge can be detrimental to the battery storage system. This detrimental condition is especially true if a battery storage system is allowed to completely discharge a battery. To prevent such incidents, discharge operations are first checked against a current level of charge or storage amount for one or more batteries of the battery storage system. If the current level of charge or storage amount is below a minimum threshold, the regulation down signal or discharge operations are limited. For example, the charger device is configured so that the regulation signal is limited to the range between 0% and 100% instead of −100% to 100%.

A second exemplary constraint that can be used relates to electric power grid events. The purpose of the regulation signal is to balance the power in and power out of the electrical system. An indication of this condition can be the average frequency of the electrical transmission. In times of significantly excessive load, the frequency of the electric power grid will often fall significantly (e.g., 0.05 Hz or more) resulting in an under-frequency event. Conversely, if the power grid load is significantly lower, the frequency of the electric power grid will rise significantly, resulting in an over-frequency event. To improve grid awareness and safety, if either of these conditions are detected, the regulation signal can be adjusted. For example, during an under-frequency event, the regulation signal can be forced to −1.0 regardless of local maximum/minimum extremes or average frequency. However, this constraint is typically superseded by the first constraint mentioned in the previous paragraph. For example, if the battery is below its capacity threshold, a regulation signal of 0.0 is provided instead of −1.0. During over-frequency events, the regulation signal can be forced to +1.0 regardless of local maximum/minimum extremes or average grid frequency. Applying this second constraint allows the load device to be "grid friendly," thereby reducing the impact of pushing the electrical power distribution system further into an under-loaded or over-loaded condition.

A third exemplary constraint that can be used is based upon external constraints applied to the load device. For example these constraints can be imposed as a time limit for reaching a certain capacity level or completing a task. For example, in a PHEV charger, this could be the desired final charging time of the vehicle. The end user of the charger can select a desired "charge by" time at which the vehicle will have a 100% state of charge in its battery system. This "charge by" time can be used to calculate the total charging time available. An average charge rate can be computed using data comprising information about PHEV/EV battery capacity, maximum charge rate, and charging efficiency.

In a system using this third constraint, the actual average "loading" rate can be evaluated, and the difference between the measured actual load rate and computed load rate can be determined. In some embodiments, the average load rate can be related to the average frequency of the system. For example, suppose a battery is determined to need to charge at a 65% rate to meet full capacity. That 65% charge rate would occur when the electric system was at the average frequency (since average frequency should be associated with roughly 0% regulation). However, random variations in the grid frequency, and thus the regulation signal, can result in an average charging rate that is lower than desired. During the same periodic check of the actual average charge rate, the desired charge rate can be updated using the computed difference. For example, if the average charge rate is lower than the desired charge rate, the associated charge rate with the average frequency will be biased appropriately. In the example previously stated, the charger determines that a 65% average charge rate should be selected. If the actual average output is determined to be 63%, a 2% bias is applied to the average desired charge rate in order to offset this period of lower regulation.

Through periodic updates, the scaling of the loading rate to up and down regulation signals can also be adjusted. The scale of these up and down regulation signals determines how the load's output will vary with the regulation signal. As mentioned earlier, one example of a signal range is for a full discharge output at a −1.0 regulation signal and a full charge output at a +1.0 regulation signal. Under these conditions, the scaling factor for the regulation down signal is the average load rate. For example, if the regulation signal is running an average of 0.5, using the average rate allows the load to vary from a desired load rate to a maximum discharge rate (for example, −100%) using the regulation signal. Thus, the scaling used for the regulation up signal is the difference between the maximum load rate and the average load rate. This allows the regulation up signals (e.g., from 0.5 to 1.0) to increase the load output between the desired average charge rate and the maximum charge rate.

In some embodiments, the regulation range is desirably restricted. For example, during periodic updates, embodiments of the disclosed technology can determine the minimum amount of time it would take to reach an end goal constraint (e.g., the amount of time it will take to charge a battery to 100%). A ratio of this minimum time and the remaining time interval can then be determined. If this ratio is greater than a predetermined or user-selected threshold (e.g., 90%), the minimum rate applied to the load can be restricted to the average loading rate needed to reach the end goal constraint. After reaching this end goal constraint, discharge back into the grid is no longer performed, effectively reducing the down regulation scaling to 0% and providing only regulation up services.

In certain embodiments of the disclosed technology, even when there is a restricted range of regulation conditions (where an end goal constraint is trying to be met), one or more overriding constraints can still be maintained. For example, one constraint that can be maintained is that significant under-frequency and over-frequency events (e.g., under-frequency or over-frequency events that exceed a fixed frequency threshold or a percentage change from the average frequency) can still result in a response from the energy storage device.

During significant under-frequency events, the charging rate can be dropped to a full-discharge or no output condition, even if this means that the end goal constraint can no longer be met. Thus, significant over-frequency events can push the load to a 100% output rate. The third exemplary constraint discussed above is related closely to over-frequency events. If the measured average load rate is higher than desired average charge rate, the device can reach the final condition earlier than anticipated. At this point, the load (e.g., the energy storage device) can be removed from service as a regulation device. The output of the energy storage device can be turned off and regulation signals can be no longer accepted in order to prevent the desired final condition from being exceeded (for example, in order to prevent a PHEV battery from exceeding 100% state of charge).

III. Exemplary Embodiments of the Disclosed Technology

FIG. 1 is a schematic block diagram illustrating an embodiment of a grid regulation system 100 according to the disclosed technology. In the embodiment shown in FIG. 1, the grid regulation system 100 comprises an electrical power distribution system (e.g., an electrical power grid) 110, an integrated unit 120 comprising a bi-directional charger 124 and controller 128, and an energy storage device 130. The electrical power distribution system 110 can be an alternating current (AC) power system or direct current (DC) power system. As shown, the integrated unit 120 combines the controller 128 and the bi-directional charger 124. The bi-directional charger 124 can use power connections 150 and 156 to send electrical power from an electrical power distribution system 110 to an energy storage device 130, thereby charging the energy storage device. The bi-directional charger 124 can also use the power connections 150 and 156 to send electrical power from the energy storage device 130 to the electrical power distribution system, thereby discharging the energy storage device to provide power to the electric power distribution system 110.

The bi-directional charger 124 receives control data, including one or more regulation signals from the controller 128, using a data connection 160, for example, using a CAN-BUS, RS-232-C, USB, FireWire, ZigBee, or other suitable connection interface. As shown in FIG. 1, both the charger and the controller are housed as one unit. In other embodiments, the bi-directional charger 124 and the controller 128 can be housed separately. Chargers such as bi-directional charger 124 can be assembled by those of ordinary skill in the art as needed for a particular embodiment of the disclosed technology. For example, a bi-directional charger can be adapted to discharge and charge a battery to and from an AC power grid or a DC power grid. In some embodiments, the bi-directional charger 124 is a single component. For example, the bi-directional charger 124 can be a charger like AC Propulsion's Reductive Charger, which drives an AC induction motor from DC batteries, and recharges the batteries via regenerative braking. In some embodiments, the bi-directional charger 124 includes two separate components. For example, for connecting an AC power grid to a battery, the bi-directional charger can comprise an AC-to-DC battery charger component, as well as a DC-to-AC inverter. In some examples, the DC-to-AC inverter is a grid-tie inverter, which can perform both DC-to-AC power conversion as well as synchronize its AC power output to the electrical power distribution system 110. In some embodiments, a flywheel connected to a motor/generator set can be used. In such embodiments, the field current in the generator can be modulated by accelerating the motor, and thereby discharge energy into the grid, or decelerating the motor, and thereby charge the flywheel.

The controller 128 can receive electrical data representing electrical characteristics of the electric power distribution system 110, such as one or more of an instantaneous frequency, average frequency, phase, voltage, current, or other such electrical characteristics over a connection 154. In embodiments where the electrical power distribution system 110 is an alternating current (AC) power system, the measured instantaneous frequency can be used. In embodiments where the electrical power distribution system 110 is a direct current (DC) power system, measured voltage can be used. In some embodiments, other electrical characteristics of the electrical power distribution system 110 (e.g., average frequency, phase, current) can be used to augment, or instead of, measured instantaneous frequency or voltage. In some embodiments, the controller 128 includes circuitry for directly measuring and/or calculating characteristics of the electric power distribution system. In other embodiments, the controller receives electrical data from an advanced-meter-infrastructure (AMI) smart meter connected to the electric power distribution system 110. Also as shown, the controller 128 includes a connection 158 to the energy storage device 130 for receiving status data, such as one or more of a state-of-charge (SOC), state-of-health (SOH), voltage, energy storage device charging rate, internal resistance, or conductance. In some embodiments, the connection 158 is a data connection and the energy storage device 130 transmits data to the controller 128. In other embodiments, the controller 128 includes circuitry for measuring the status data directly over the connection 158.

The energy storage device 130 can be an electrical battery of any chemistry, for example, Lithium ion, Nickel Cadmium, Lead-Acid, Nickel Metal Hydride, Polysulfide Bromide, or any other suitable battery technology. In some embodiments, the energy storage device can be another suitable energy storage technology, such as a mechanical flywheel, fuel cell, pumped water storage, compressed air, or other suitable chemical, electrochemical, electrical, or mechanical apparatus that is adaptable to store energy from the electric power distribution system 110. In some embodiments, the energy storage device can be coupled to an energy generation device, for example, a photovoltaic power system.

Figure 2:
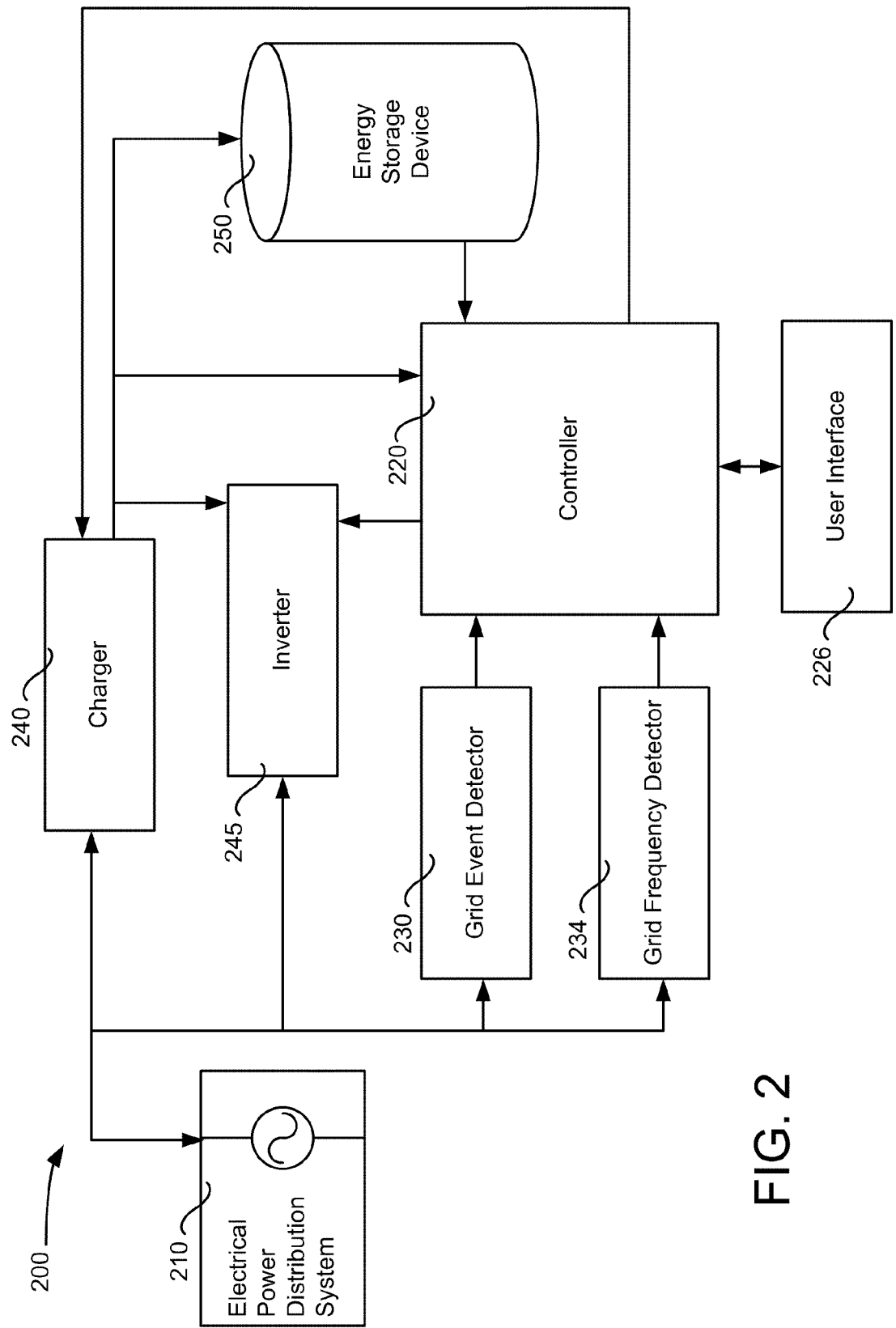
FIG. 2 is a schematic block diagram depicting an embodiment of the controller and bi-directional charger of FIG. 1 in which the controller is coupled to a user interface, a grid event detector, and a grid frequency detector.

FIG. 2 is a schematic block diagram illustrating another embodiment of a grid regulation system 200 according to the disclosed technology. In the embodiment shown in FIG. 2, the grid regulation system 200 comprises an electrical power distribution system (e.g., an electrical power grid) 210, a charger 240, an inverter 245, an energy storage device 250, a controller 220 coupled with a user interface 226, a grid event detector 230, and a grid frequency detector 234. The charger 240 can charge the energy storage device 250 by converting and transmitting AC power from the electrical power distribution system 210 to the energy storage device as DC current. The inverter 245 can discharge DC current from the energy storage device 250 and supply it to the electrical power distribution system 210 as AC power. In the illustrated embodiment, both the charger 240 and the inverter 245 can accept commands from the controller 220, including simple on/off or discrete charging/discharging rates.

As shown, the grid event detector 230 monitors the electrical power distribution system 210 and reports events (for example, one or more of an under-frequency event, over-frequency event, low-voltage event, high-voltage event, or other such events to the controller 220). In some embodiments, the grid event detector 230 can report events using data from a smart meter or other AMI device. Events reported by the grid event detector 230 can be used to override normal charging or discharging operations in progress. For example, if an under-frequency event is sent from the grid event detector 230, the controller 220 can transmit control data to the inverter 245 to discharge the energy storage device 250 in order to provide power to the electric power distribution system 210, thus helping to stabilize the electric power distribution system.

Also coupled with the controller 220 is a grid frequency detector 234, which transmits data regarding the frequency of the electric power distribution system 210. In some embodiments, the grid frequency detector 234 transmits instantaneous frequency data and average frequency, while in other embodiments the grid frequency detector transmits only the instantaneous frequency data and the controller calculates the average frequency data using the instantaneous frequency data.

Also shown in FIG. 2 is a user interface 226, which is coupled to the controller 220. The user interface 226 allows a user to transmit commands and parameters to the controller (for example, a desired charge completion time) or to override the controller and cause the 240 to charge the energy storage device 250 or cause the inverter 245 to discharge the energy storage device at a fixed rate of charge/discharge.

Figure 3:
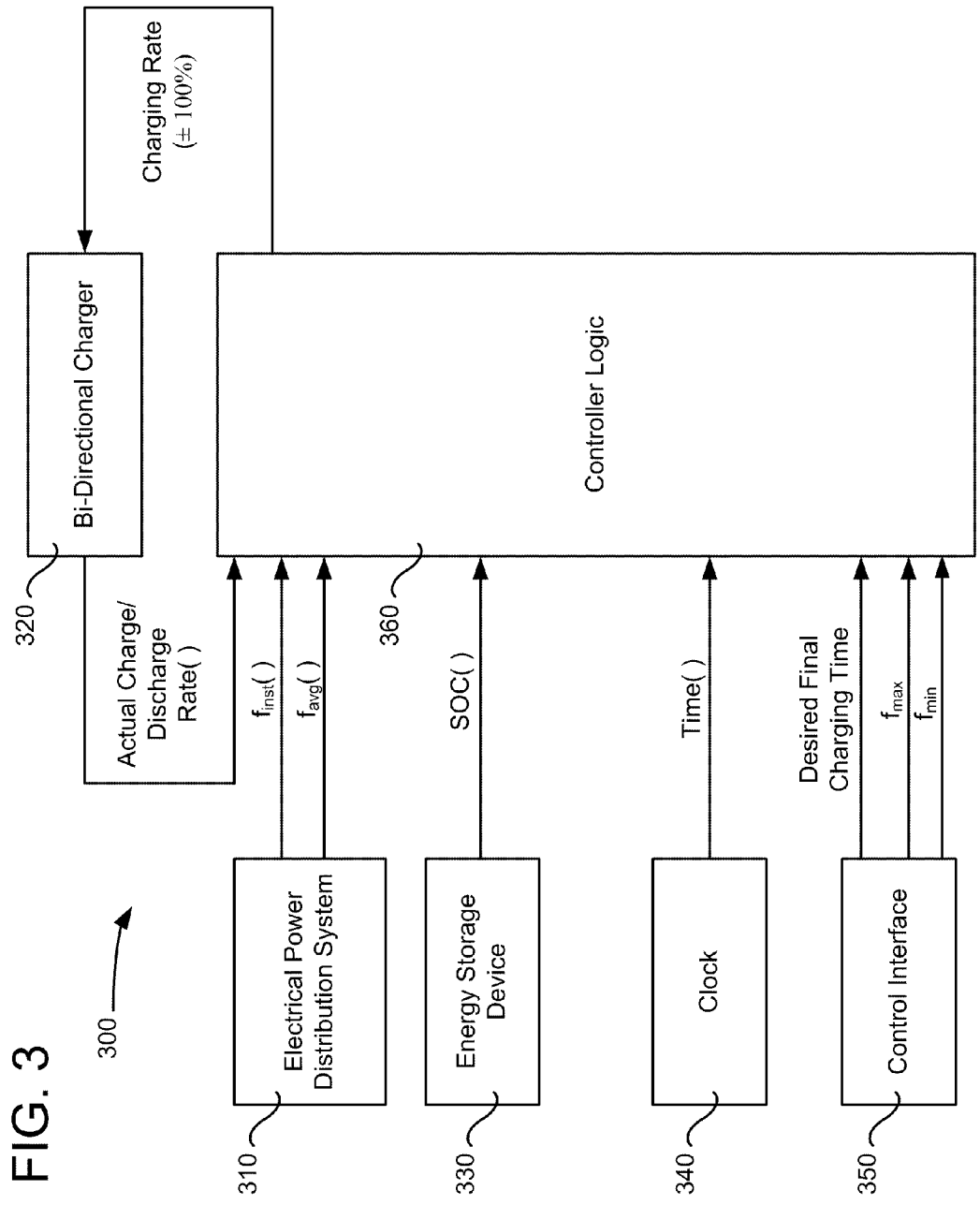
FIG. 3 is a schematic block diagram depicting an embodiment of the controller of FIG. 1 in which the controller is configured to receive signals from an electrical power distribution system, a bi-directional charger, an energy storage device, a clock, and a control interface.

FIG. 3 is a schematic block diagram illustrating a further embodiment of a grid regulation system 300 according to the disclosed technology. In the embodiment shown in FIG. 3, controller 360 receives data from different entities, including instantaneous frequency data ($f_{inst}()$) and average frequency data ($f_{avg}()$) from an electric power distribution system 310, actual charge and discharge rate data for the energy storage device from bi-directional charger 320, and state-of-charge data (SOC) from energy storage device 330. Controller 360 can also receive data indicating a current time or remaining time (time( )) from a clock 340, as well as a desired final charging time, maximum frequency $f_{max}$ and minimum frequency $f_{min}$ from control interface 350. The controller 360 can be implemented using general purpose computing hardware (comprising, for example, a computer processor and memory) or using special purpose hardware (comprising, for example, a dedicated integrated circuit or programmable logic device). The entities providing the controller 360 with data can comprise hardware entities or components of a software environment (for example, software modules). As will be discussed further below, the controller 360 uses the input data to calculate a desired charging rate, which is transmitted to the bi-directional charger 320. As discussed herein, the desired charging rate can be expressed as ranging from −100% to +100% of the maximum charge/discharge rate of the bi-directional charger, but it will be understood by one of ordinary skill in the art that the desired charging rate can be expressed in other units, for example, −1.0 to +1.0, absolute or relative amps, volts, or other such units or ranges. The control interface 350 can be a display and/or data entry device configured to display and input user data and control parameters, such as a desired final charging time, maximum frequency $f_{max}$, and minimum frequency $f_{min}$.

Figure 4:
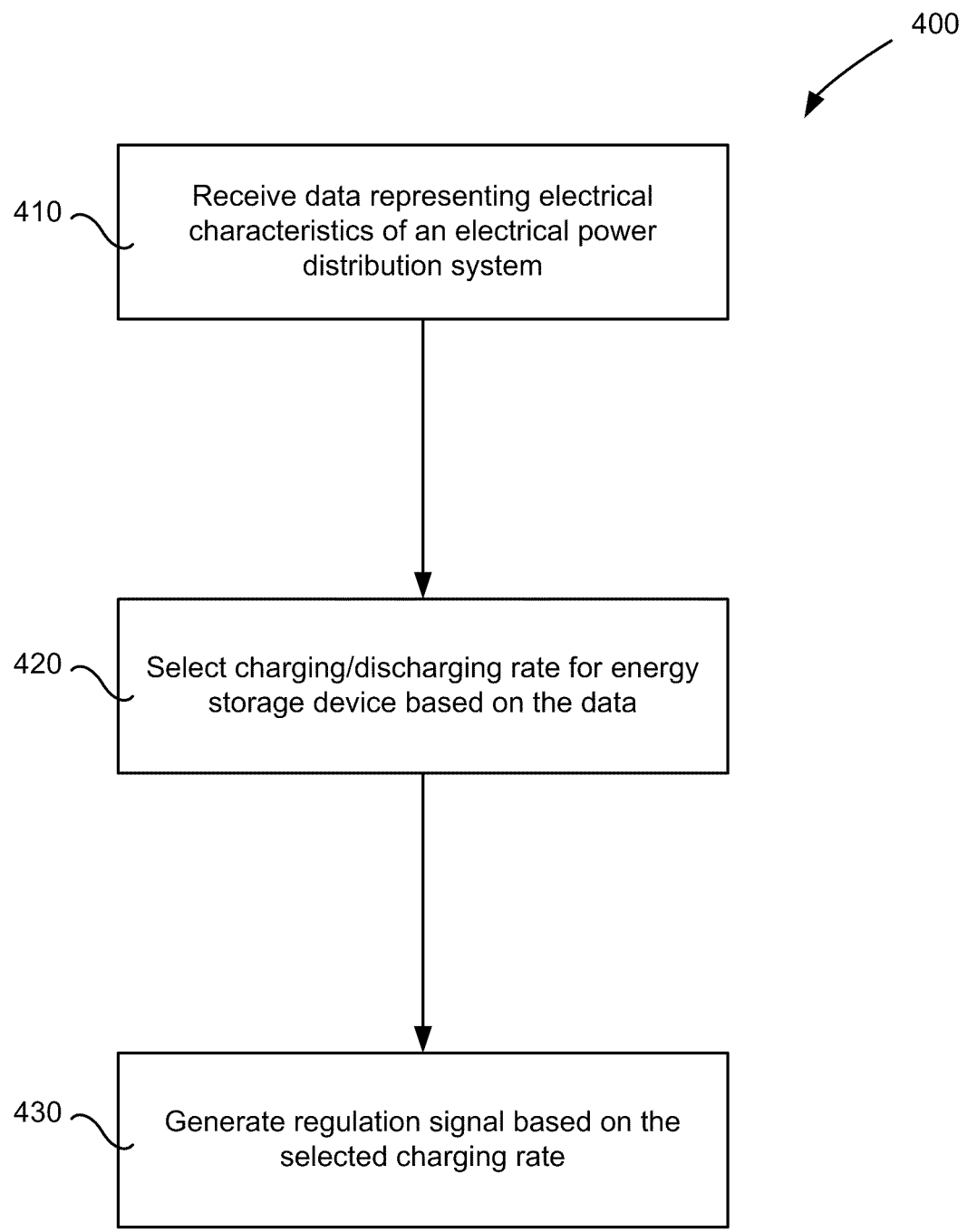
FIG. 4 is a flow chart of an exemplary method of generating a regulation signal for an energy storage device based on data received representing electrical characteristics of an electrical power distribution system.

FIG. 4 is a flow chart 400 showing a generalized method for selecting a charging/discharging rate for an energy storage device based on data representing electrical characteristics of an electric power distribution system. At process block 410, data representing electrical characteristics of an electric power distribution system (e.g., a power grid) is received. The data received can include, for example, one or more data messages indicating an instantaneous frequency of the power grid, an average frequency of the power grid, a high voltage level of the power grid, a low voltage level of the power grid, or a level of phase shift of the power grid.

At process block 420, the electrical characteristic data is used, at least in part, to select a desired charging/discharging rate for an energy storage device. For example, the data used can include the instantaneous frequency for the electric power grid and the average frequency of the electric power grid. Selecting the desired charging/discharging rate can also comprise normalizing the output regulation signal for the range of frequency signal input. In one implementation, the difference between the instantaneous and average frequency is measured to obtain a regulation up/down signal. Next, the signal is normalized for the frequency range of the power grid and desired charge rate. For example, a frequency range of 59.9 to 60.1 Hz can be normalized to a range of −1.0 to 1.0 for the output regulation signal. The regulation signal can be biased to exhibit a desired behavior (e.g., if charging is desired, the frequency difference can be offset by +0.5 to obtain a regulation signal range of −0.5 to 1.0 (since the nominal regulation signal is clamped at 1.0)). Another method that can be used is to use the local minimum and maximum of the frequency data, as discussed above.

Also at process block 420, the selected charging/discharging rate can be modified based on other constraints. For example, the selected charging/discharging rate can be modified based on one or more of the amount of load presented by the energy storage device, safety constraints of the energy storage system (for example, a minimum SOC level), electric power grid events, or external constraints such as a charge-by time limit. In addition, the average loading rate of the energy storage device can be evaluated and adjusted based on the actual average output of the charging device. For example, a 2% bias may be applied to increase the actual average output from 63% to a desired 65% as discussed above.

Finally, at process block 430, a regulation signal is generated for controlling a bi-directional charger. The regulation signal can be based on or comprise the selected charging/discharging rate.

Figure 5:
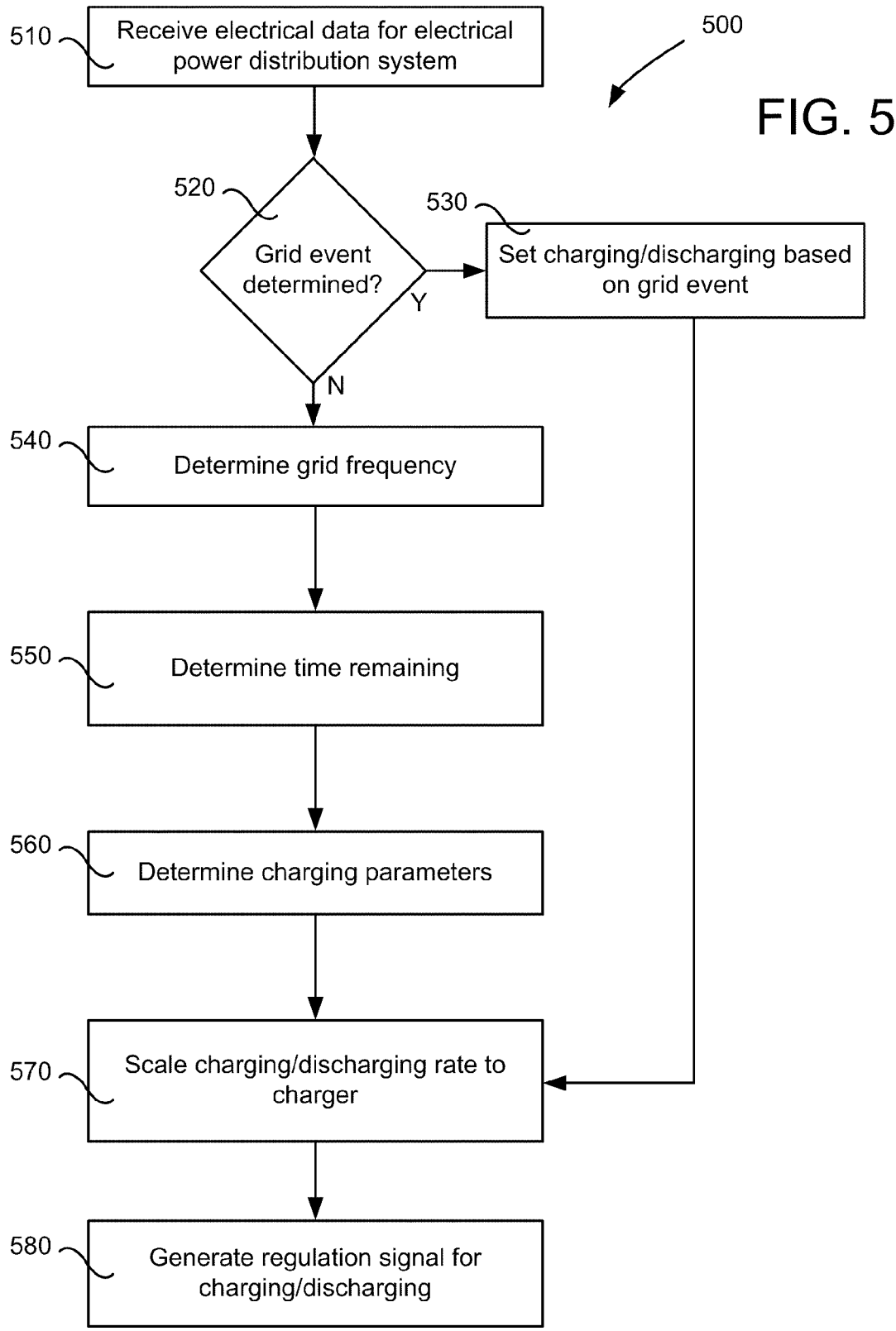
FIG. 5 is a flow chart of an exemplary implementation of the method shown in FIG. 4.

FIG. 5 is a flow chart 500 showing a more specific method for generating a regulation signal for a bi-directional charger based on data representing electrical characteristics of an electric power distribution system including grid events. At process block 510, electrical data representing electrical characteristics for an electric power distribution system is received. At process block 520, the electrical data is analyzed to determine if a grid event has been received. For example, the electrical data can comprise instantaneous frequency data, which is compared against a maximum and minimum frequency limit. If the instantaneous frequency data exceeds either the maximum or minimum frequency limit, a grid event is determined and the method proceeds to process block 530. Alternatively, the electrical data can comprise data indicating the existence of a grid event. For example, a smart meter can generate data indicating the existence of a grid event. If it is determined that a grid event has not occurred, the method proceeds to process block 540.

At process block 530, a charging/discharging rate is selected based on the grid event. For example, in the case of an under-frequency event, the charging rate can be output as −1.0 (signaling a full discharge rate for the energy storage device in order to supply electric power into the power grid). As another example, in the case of an over-frequency event the charging rate can be output as +1.0 (signaling a full charge rate for the energy storage device).

At process block 540, an average frequency for the power grid is determined. In some embodiments, the average frequency is determined using the instantaneous frequency data from the received electrical data. A FIR filter can be used to determine the average frequency from the instantaneous frequency data. In other embodiments, both the average and instantaneous frequency data are received from the power grid, or from a charging station connected to the power grid.

At process block 550, the time remaining to reach full charge is determined. The current time can be compared to a target charge completion time, and the difference can be computed as the time remaining to full charge. Alternatively, a time to full charge is set, and the time is decremented until time zero is reached. The charge completion time can be set, for example, using a user interface coupled to a controller.

At process block 560, one or more charging parameters for a bi-directional charger are determined. The charging parameters can be determined using the grid frequency data from process block 540 and the time remaining from process block 550. In addition, operational characteristics of the targeted energy storage device, the bi-directional charge, and the power grid itself can be taken into account.

At process block 570, a charging/discharging rate for the bi-directional charger is determined. If the method arrives at process block 570 from process block 530, the grid event is the primary or only determinant of the charging rate that will be output to the charger. Thus, by setting a charging/discharging rate at process block 530, other input data can be ignored. In the event that a grid event has not been received, then a charging rate is scaled to a normalized charging/discharging rate for the charger.

At process block 580, a regulation signal capable of communicating the normalized charging/discharging rate is generated. This regulation signal can be transmitted to a bi-directional charger, or to a charger and an inverter, in order to generate the desired charging response.

Figure 6A:
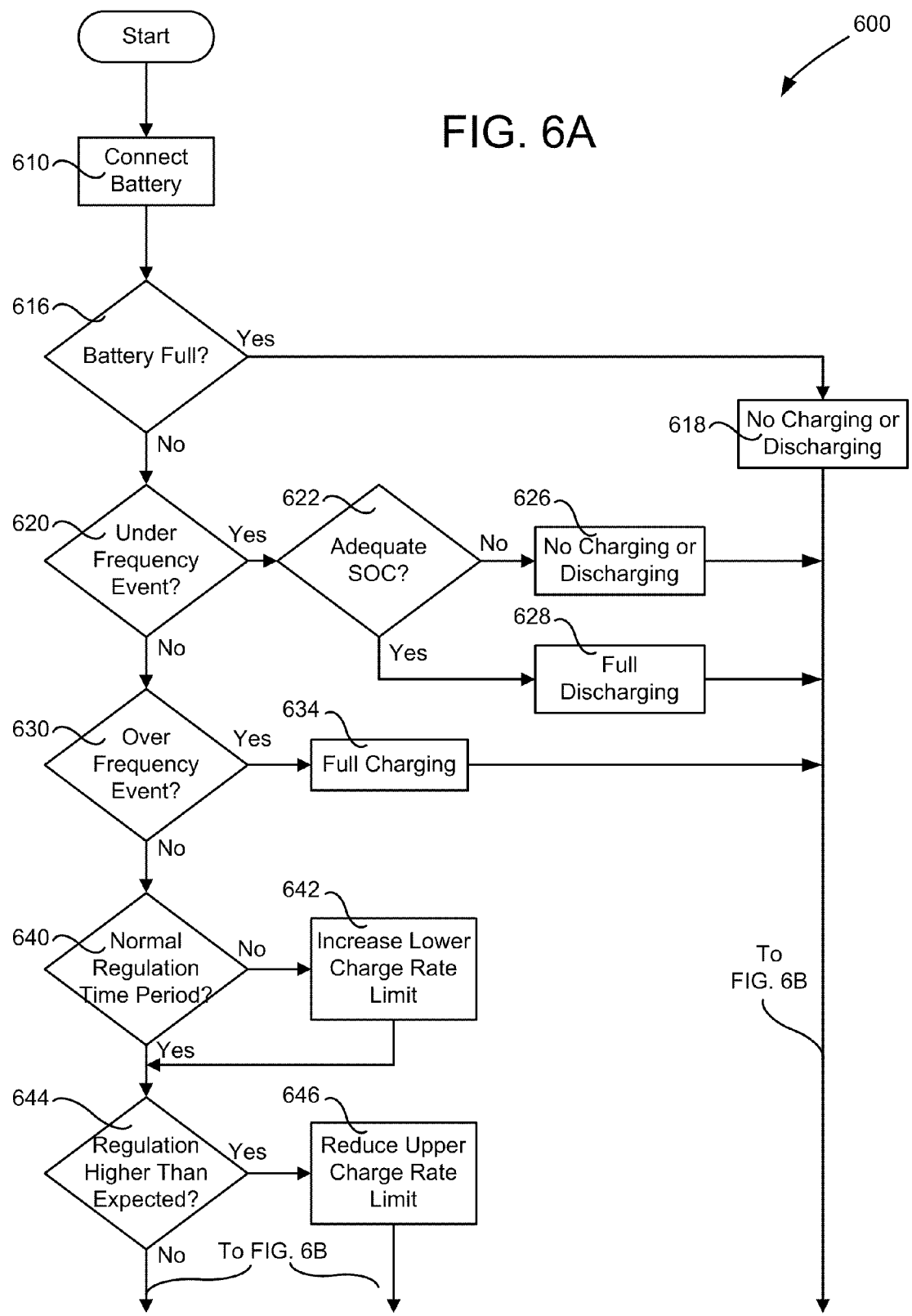
FIGS. 6A-6B is a flow chart that outlines another exemplary implementation of the method shown in FIG. 4.
Figure 6B:
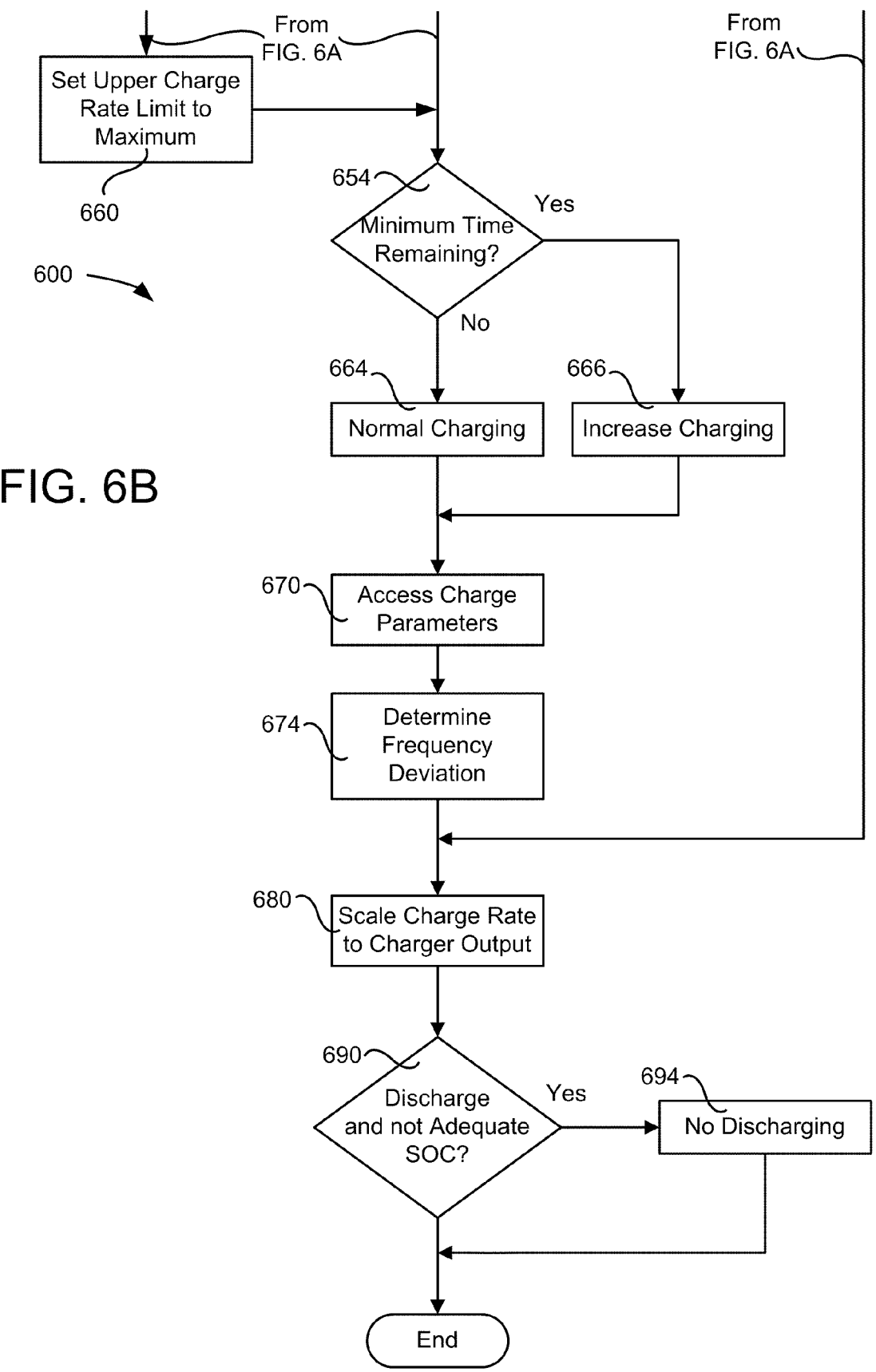

FIGS. 6A and 6B are a flow chart 600 showing another specific method for generating a charger output rate for a bi-directional charger based on data indicative of the electrical characteristics of an electric power distribution system. The data can include, for example, grid events, grid frequency data, battery SOC, or actual charge rate data. The illustrated method can be implemented using a controller, for example, an embedded microcontroller system. The illustrated method can be repeatedly executed during a charge/discharge cycle of a battery system. Other methods are possible that include additional or fewer method acts. As discussed further below, the regulation output rate ranges from −1.0 to 1.0, with −1.0 representing a state of full discharge, 0.0 representing a state of neither charging or discharging, and 1.0 representing a state of full charging. The charger output rate represents the charging rate at which the bi-directional charger will be commanded to operate. The charger output rate is based on the regulation output rate and can be expressed in Watts. Data can be sent to the bi-directional charger using a regulation signal. The regulation signal can include data representing the regulation output rate or the charger output rate.

FIG. 6A is a portion of the flow chart 600 showing a method for generating a regulation signal. At process block 610 a battery system (an example of an energy storage device) is coupled to a controller. At process block 616, the controller determines whether the battery is in a full (100% SOC) charge state. In one embodiment, the controller monitors battery performance during operation to determine the battery system SOC. In other embodiments, the controller communicates with a battery management system connected to the battery, and the battery management system determines the SOC. If the controller determines that the battery is in a full charge state, then the method proceeds to process block 618, where the regulation output rate for the charger is set to "no charging or discharging" (e.g., on a normalized scale of −1.0 to +1.0, a charge rate of 0.0). In some embodiments, the regulation output rate at process block 618 is set to "no charging," which still allows discharging. Setting the charger to "no charging" instead of "no charging or discharging" at process block 618 may be desirable when the energy storage device is a fixed energy storage device, instead of an EV/PHEV. Otherwise, the battery is determined to not be in a state of full charge, and the method proceeds to process block 620.

At process block 620, the controller checks to determine if a significant under-frequency event has occurred. If so, the method proceeds to process block 622. Otherwise, the method proceeds to process block 630. The occurrence of an under-frequency event can be determined by receiving a signal indicating an under-frequency condition on the power grid, or can be determined by comparing instantaneous or average power grid frequency to a pre-determined low frequency limit. For example, in a 60 Hz AC power grid, a power grid frequency of 59.95 Hz or lower could be defined as a significant under-frequency event. The frequency value selected as indicating an under-frequency event can depend on the average frequency of the grid and the grid's stability.

At process block 622, the controller determines whether the battery has an adequate SOC. If so, the method proceeds to process block 628, where the regulation output rate is set to "full discharge" (e.g., −1.0)). Otherwise, the method proceeds to process block 626, where the regulation output rate is set to "no charging or discharging" (e.g., 0.0). At process block 630, the controller checks to determine if an over-frequency event has occurred. If so, the method proceeds to process block 634, where the regulation output rate is set to "full charging" (e.g., 1.0)). Otherwise, the method proceeds to process block 640. The occurrence of an over-frequency event can be determined by receiving a signal indicating an over-frequency condition on the power grid, or can be determined by comparing instantaneous or average power grid frequency to a pre-determined high frequency limit. For example, in a 60 Hz AC power grid, a power grid frequency of 60.05 Hz or higher could be defined as a significant over-frequency event. The frequency value selected as indicating an over-frequency event can depend on the average frequency of the grid and the grid's stability.

At process block 640, the controller determines if the predicted charge completion time is within a normal regulation period. If the controller determines that the predicted charge completion time is not within the normal regulation time period, the lower charge rate limit is increased at process block 642. In one embodiment, the normal regulation time period may correspond to the time period of a charging cycle that occurs after charging is initiated until a fixed period of time threshold (e.g., thirty minutes) before the point in time when the battery is desired to be fully charged. In one embodiment, the controller calculates the remaining amount of time for charging from the present time to the desired point of time in the future for full charging and compares the calculated remaining amount of time with the threshold to determine whether the charging is within the normal regulation time period (e.g., whether the remaining amount of time for charging is greater than the threshold).

At process block 642, the controller increases the lower charge rate limit to the average charge rate needed to achieve the desired charge level within the regulation time period. For example, the lower charge rate limit could be set to 0.2 from 0.0. The normal regulation time period can be determined by, for example, a user setting a desired final charge time, a user setting a desired charging period, or by a pre-determined charging period (for example, four hours). In one embodiment, the controller scales a needed charge rate to the rate needed to achieve full charge by the desired point of time in the future using, for example, the capacity information of the battery, time remaining to reach full charge, and charger efficiency. For example, the controller can scale a previously determined needed charge rate by 1.01 to provide a new needed charge rate. This needed charge rate is later used to generate the regulation output rate, and hence, the charger output rate.

At process block 644, the controller determines whether the battery will be charged earlier than the end of the normal regulation time period. In one embodiment, the controller compares the actual charge rate with the desired charge rate. In one example, the controller determine whether a regulation ratio value is greater than a predetermined regulation high deviation limit. In one embodiment, the regulation ratio value is calculated as:

$$\text{regulation ratio value} = \frac{\left(\begin{array}{c}\text{measured charge rate} - \\ \text{needed charge rate}\end{array}\right)}{\text{maximum charge rate of charger}}$$

where the measured charge rate is the average charge rate of the charger over a time period (for example, five minutes). The result of this calculation can be multiplied by 100 to provide the regulation ratio value in percent. In one embodiment, the regulation high deviation limit is a limit above the needed charge rate to which charging can exceed the needed charge rate (e.g., 15%).

If process block 644 determines that the battery will be charged earlier than the end of the normal regulation time period, the controller proceeds to process block 646, where the controller reduces the upper charge rate limit to the average charging rate needed to achieve the desired charge level within the regulation time period. For example, the upper charge rate limit could be set from 3.3 kW to 2.8 kW. The upper charge rate limit and the lower charge rate limit are used as upper and lower bounds for the regulation output rate, which varies based on the frequency of the power grid. Thus, the charging rate can be clamped between a range established by the upper and lower charge rate limits. The upper and lower charge rate limits can be expressed in units of, for example, Amps, kilowatt-hours, or as a percentage of the maximum output.

Turning to FIG. 6B, which is a portion of the flow chart 600 showing a generalized method for generating a regulation signal. At process block 660, the upper charge rate limit is set to the highest allowable level (e.g., 3.3 kW).

At process block 654, the controller determines whether the current charger output rate is sufficient to charge the battery within the minimum time needed to finish charging. This minimum time remaining represents the shortest amount of time the battery could reach full charge given the battery SOC, charging efficiency, and upper charge rate limit. If the controller determines that the battery will not be charged within the minimum time needed to finish charging, the regulation output rate is increased at process block 666, where an increased output charge rate is determined that will cause the charger to charge the battery within the normal regulation time period. Otherwise, the charging rate is determined to be normal, and the upper and lower charge rate limits are adjusted at process block 664. The minimum time needed to finish charging can be calculated using a formula, for example:

$$\text{minimum time} = \frac{\text{capacity charge}}{\text{maximum rate} \times \text{charge efficiency}}$$

where capacity charge is the amount of battery charge that still needs to be charged (in kilowatt-hours), the charge efficiency is an efficiency rate determined for the battery (for example, 0.98), and the maximum rate is the maximum possible output level for the charger (in kilowatt-hours). The amount of time remaining can be determined by, for example, a user setting a desired final charge time, a user setting a desired charging period, or by a pre-determined charging period (for example, four hours). In some embodiments, the controller calculates a time left ratio and determines that the regulation rate should be increased based on this time left ratio (e.g., 98.5%). In one embodiment, the normal regulation time period may correspond to the time period of a charging cycle that occurs after charging is initiated until a fixed period of time threshold (e.g., thirty minutes) before the point in time when the battery needs to be fully charged. In one embodiment, the controller calculates the remaining amount of time for charging from the present time to the desired point of time in the future for full charging and compares the calculated remaining amount of time with the threshold to determine whether the charging is within the normal regulation time period (e.g., the remaining amount of time for charging is greater than the threshold).

At process block 664, the regulation output rate is set to "normal charging." In one particular implementation, the upper and lower charge rate limits are defined relative to the average charge rate. The upper charge rate represents the maximum amount (e.g., in kilowatt-hours or amps) that the charging rate can exceed the current average charge rate, and the lower charge rate represents the maximum amount the charging rate can fall below the current average charge rate. In other examples, the upper and lower charge rate limits can be defined in absolute terms, in which case the relationships described below are adjusted accordingly. If the average charge rate is greater than the maximum possible output level for the charger, the upper charge rate limit is set to zero. Otherwise, the upper and lower charge rate limits are adjusted according to this relationship:

upper charge rate limit=maximum rate−average charge rate lower charge rate limit=average charge rate+maximum discharge rate The maximum rate is the maximum possible output level for the charger, and the maximum discharge rate is the maximum possible output level for the charger in the discharging direction (e.g., the maximum possible output level for an inverter powering the electrical power distribution system).

At process block 666, the regulation output rate is set to "increase charging." In one embodiment, the upper and lower charge rate limits are adjusted as follows. If the maximum charger output rate divided by two is greater than the average charge rate, then the lower charge rate limit is not adjusted, while the upper charge rate limit is adjusted according to this relationship:

$$\text{upper charge rate limit} = \frac{\text{maximum rate} - \text{average charge rate}}{3}$$

If the maximum charger output rate divided by two is less than or equal to the average charge rate, then the upper and lower charge rate limits are adjusted according to this relationship:

$$\text{upper charge rate limit} = \text{maximum rate} - \text{average charge rate}$$

$$\text{lower charge rate limit} = \frac{\text{average charge rate} + \text{maximum discharge rate}}{3}$$

At process block 670, the controller accesses one or more charge parameters, which can include one or more of the regulation output rate set at process blocks 660, 664, and 666, as well as the upper and lower charge rate limits selected at, for example, process blocks 642 and 646. Other charging parameters can include one or more of time remaining (normal regulation time period), average battery charge rate (e.g., in kilowatts), battery SOC (e.g., in percent), and battery system capacity (e.g., in Amp-Hours). Other charge parameters can include one or more of maximum battery charge rate, maximum battery discharge rate, charge efficiency, the up deviation percent (the percentage the average charge rate is allowed to exceed the nominal ratio), and the down deviation percent (the percentage the average charge rate is allowed to fall below the nominal ratio).

At process block 674, the frequency deviation of electrical energy on the electrical power distribution system is determined by comparing the current frequency of the electrical energy on the electrical power distribution system with the nominal frequency of the electrical energy on the electrical power distribution system. In one embodiment, an average frequency of the electrical energy is calculated and used as the nominal frequency. One example technique for obtaining the average frequency information from direct measurements of the electrical energy received at the location of the battery charging system is to use a recursive implementation of a finite-impulse-response (FIR) filter. In one embodiment, the FIR filter computes the average frequency for a predetermined amount of time (e.g., five minutes). In some embodiments, the filter can be reinitialized if the system frequency significantly exceeds or drops below the average frequency, for example, if the frequency exceeds the under- or over-frequency thresholds discussed above by a fixed or user-selected amount (e.g., a measurement of 61.5 Hz when the threshold is 60.5 Hz).

At process block 680, the controller scales the regulation output rate to the charger output rate. If the current instantaneous frequency is greater than the average frequency, normalization of the current frequency measurement to a historical frequency can be implemented according to the relationship:

$$\text{normalized frequency} = \frac{(\text{current frequency} - \text{average frequency})}{\left(\text{maximum frequency} - \text{average frequency}\right)}$$

where the maximum frequency can be the maximum value of the system frequency during a previous time period (for example, two minutes). The normalized regulation output rate can then be multiplied by the upper charge rate limit previously calculated and added to the average charge rate to determine the appropriate rate of charging.

If the current instantaneous frequency is less than the average frequency, of the current frequency measurement to a historical frequency can be implemented according to the following relationship:

$$\text{normalized frequency} = \frac{(\text{current frequency} - \text{average frequency})}{\left(\text{average frequency} - \text{minimum frequency}\right)}$$

where the minimum frequency can be the minimum value of the instantaneous frequency during a previous time period, for example, two minutes. The normalized regulation output rate can by multiplied by the lower charge rate limit previously calculated and added to the average charge rate to determine the appropriate output charge rate to be applied to the battery system. For instance, in the example depicted in FIGS. 11A-11G, the regulation rate can vary from −1.0 to +1.0, while the charger output rate for the bi-directional charger can vary from −3.3 kW to +3.3 kW. In other embodiments, the charging and discharging rates need not be symmetric. For example, where the bi-directional charger output rate varies from −0.8 kW to +3.0 kW, a regulation rate of −1.0 to 0.0 can linearly vary the charger output rate between −0.8 kW to 0.0 kW (e.g., a 0.1 change in the regulation rate changes the discharging rate by 0.08 kW), while a regulation rate of 0.0 to +1.0 can linearly vary the charger output rate between 0.0 kW to 3.0 kW (e.g., a 0.1 change in the regulation rate changes the discharging rate by 0.3 kW).

At process block 690, the controller determines if the charger output rate determined at process block 680 is set to a discharging value (e.g., a negative value), and if so, determines whether the battery system has an adequate SOC by, for example, comparing a measured battery SOC to a predetermined value. In one embodiment, the predetermined value is 20% SOC. This determination is performed to protect the battery system, which can be damaged or prematurely aged if discharged below a pre-determined level of SOC. If the charger output rate from process block 680 is set to a discharging value and the SOC is determined to not be adequate, the method proceeds to process block 694, and the charger output rate is set to not discharge (e.g., the energy storage device can charge, but will not discharge). If the charger output rate from process block 680 is set to a discharging value and the SOC is determined to be adequate, or if the charger output rate is set to charge or no charge, the charger output rate is set to the value determined at process block 680.

It should be understood that the method acts in FIGS. 6A and 6B do not necessarily occur in the illustrated sequence. For example, the occurrence of an over-frequency event (illustrated at process block 630) can be determined before the occurrence of an under-frequency event (illustrated at process block 640). In addition, in some embodiments, certain process blocks can be modified or skipped entirely. For example, the method acts performed at process blocks 616 and 618 can be skipped entirely.

FIG. 7A is a schematic block diagram illustrating an embodiment of a grid regulation system 700 according to the disclosed technology. In the embodiment shown in FIG. 7A, the grid regulation system comprises an electrical power distribution system 710, a electric vehicle charging station 720, and an electric vehicle 730. In some embodiments, the electric vehicle 730 can be a plug-in hybrid electric vehicle (PHEV) including a lithium-ion battery system (not shown). The electric vehicle 730 acts as an energy storage device, and can receive power from, and supply power to, the electrical power distribution system 710 when connected to the charging station 720 using an appropriate electric vehicle connector (for example, an SAE standard J1772 connector) 724 to connect to the charging port 734. As shown, electric vehicle connector 724 uses an AC current connection and includes control pins for communicating control signals between the charging station 720 and the electric vehicle 730 that includes proximity detection (to prevent movement of the vehicle while connected to the charger) and control signals to coordinate the charging/discharging rate between the electric vehicle and the charging station. In other embodiments, a different suitable connector can be used, for example an IEC 62196 connector. The electric vehicle connector 724 need not be limited to AC connections but can include, for example, connections using DC current or electromagnetic induction.

FIG. 7B shows an example user interface 750 which can be coupled to a controller (not shown) for transmitting commands and parameters to the controller for regulating charge/discharge cycles. As shown, the user interface includes an LCD touch screen 764 mounted in a dashboard console 760 of an electric vehicle. The LCD touch screen 764 displays buttons for controlling the normal regulation charge time for an electric vehicle including a "down" button 770 to reduce the target charge time and an "up" button 772 for increasing the target charge time. The touch screen 764 also displays the target charge time 780 that the controller is currently set to (e.g., 6:00 AM). Once the electric vehicle user has set the desired target charge time, the user can initiate a charging sequence by touching the "Charge Now" button 784 displayed on the touch screen 764. The user interface is not limited to an LCD touch screen but can be implemented in several additional ways, including using mechanical buttons, LED displays, plasma displays, electronic ink, or a connection to a remote device such as a smart phone, laptop computer, or the like. The user interface 750 can be used not just to adjust the target charge time, but can also be used to adjust other charger functionality as well. In some embodiments, the user interface 750 can be combined with other vehicle systems to adjust other vehicle functionality as well.

Figure 8:
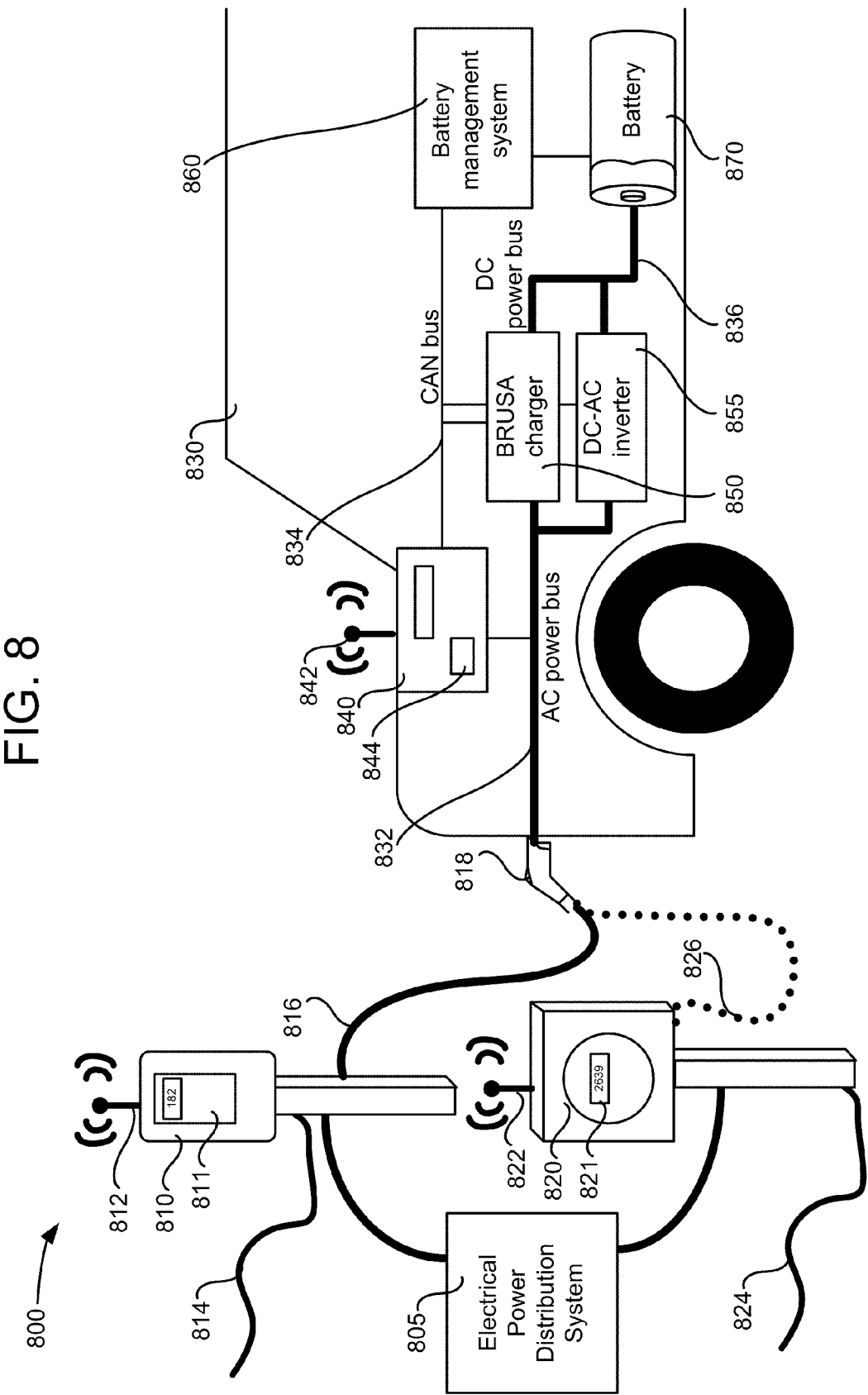
FIG. 8 is a schematic block diagram depicting an electric vehicle implementing aspects of the disclosed technology than can be connected to a remote charging station or home charging station. The electrical vehicle of FIG. 8 includes a controller, charger, inverter, and battery management system, all of which are coupled using a CAN bus.

FIG. 8 is a schematic block diagram illustrating an embodiment of a grid regulation system 800 according to the disclosed technology. The grid regulation system 800 represents a particular implementation of the system 700 shown in FIG. 7A. In the embodiment shown in FIG. 8, an electric vehicle 830 is connected to a public charging station 810. Alternatively, the electric vehicle 830 can be connected to a home charging station 820. The public charging station 810 includes a user interface 811 having a display, a ZigBee wireless network access point 812, an AC power connection to an electrical power distribution system 805, and a communication link 814 to an electric service provider. The public charging station 810 is connected to the electric vehicle 830 via an AC power connection 816, which connects to the electric vehicle using a J1772 electric vehicle connector 818. In some examples, the public charging station 810 performs power metering and can process debits and credit transactions for power transferred between the charging station and the electric vehicle 830.

As shown, the electric vehicle connector 818 is connected to an AC power bus 832 in the electric vehicle 830. The AC power bus 832 is connected to an AC-to-DC battery charger 850, DC-to-AC grid-tie inverter 855, and a controller 840, which includes a grid-friendly chip 844 to assist with ancillary services for the grid based on, for example, AC frequency or AC voltage. The AC-to-DC battery charger 850 is connected to a battery 870, which is an example of an energy storage device, via a DC power bus 836. The AC-to-DC battery charger 850 is also connected to the controller 840 over a CAN bus 834. The DC-to-AC grid-tie inverter 855 can convert DC power received from the battery 870 to AC power, thus providing power to the electric power distribution system 805. Also connected to the energy storage device 870 is a battery management system 860, which can assist with battery charge/discharge regulation, as well as report battery parameters to the controller 840 using the CAN bus 834. The controller 840 can issue commands to the battery charger 850 and the grid-tie inverter 855 over the CAN bus 834, as well as receive parameters regarding, for example, charging performance. The controller 840 also has a ZigBee wireless network access point 842 that can be used to communicate with public charging station 810 or home charging station 820.

The home charging station 820 includes a user interface 821 having a display, a ZigBee wireless network connection 822, an AC power connection to an electrical power distribution system 805, and a communication link 824 to an electric service provider. The home charging station 820 can be a residential smart meter, such as an AMI smart meter, and includes a communication link 824 to an electric service provider. In some examples, the home charging station 820 performs power metering can process debits and credit transactions for power transferred between the charging station and the electric vehicle 830. In some examples, the public charging station 810 and/or home charging stating 820 can perform some or all of the functions of the controller 840, for example, determining a regulation output rate or a charger output rate, which can both be transmitted to the battery charger and/or grid-tie inverter using the ZigBee wireless network connection 812 and 822, or by using the electric vehicle connector 818 to connect to the CAN bus 834. or by providing charging and discharging power to the electric vehicle. For example, the public charging station 810 and/or home charging station 820 can communicate with the electric vehicle 830 using the SAE J2847 standard to send control signals to the vehicle via an electric vehicle connector 818 (e.g., an SAE J1772 connector). In other embodiments, the public charging station 810 and/or home charging stating 820 do not send a regulation output rate or charger output rate, but instead provide charging power directly to, and accept discharging power directly from, the electric vehicle 830 over an AC or DC power connection.

Figure 9:
FIG. 9 is an image of an exemplary controller and charger as can be used in some embodiments of the disclosed technology.

FIG. 9 is a depiction of a grid regulation system 900 according to the disclosed technology, which includes a controller 910 having a display 920, a BRUSA AC-to-DC charger 930, which is connected to the smart charger over a CAN interface via a DSUB-9 connector and a serial cable 940, and connected to an energy storage device (not shown) over a DC power bus 950.

IV. Experimental Results

FIGS. 11A-G are graphs showing power output, regulation output, instantaneous frequency, average frequency, difference between instantaneous and average frequency, battery capacity, battery SOC, and average charging rate for a controller coupled to a bi-directional charger and battery when performing a method of selecting a charger output rate in response to receiving data representing electrical characteristics of an electric power distribution system in accordance with the disclosed technology. As shown, the frequency input data used represent hundreds of instantaneous frequency measurements for an electric power grid.

Figure 11A:
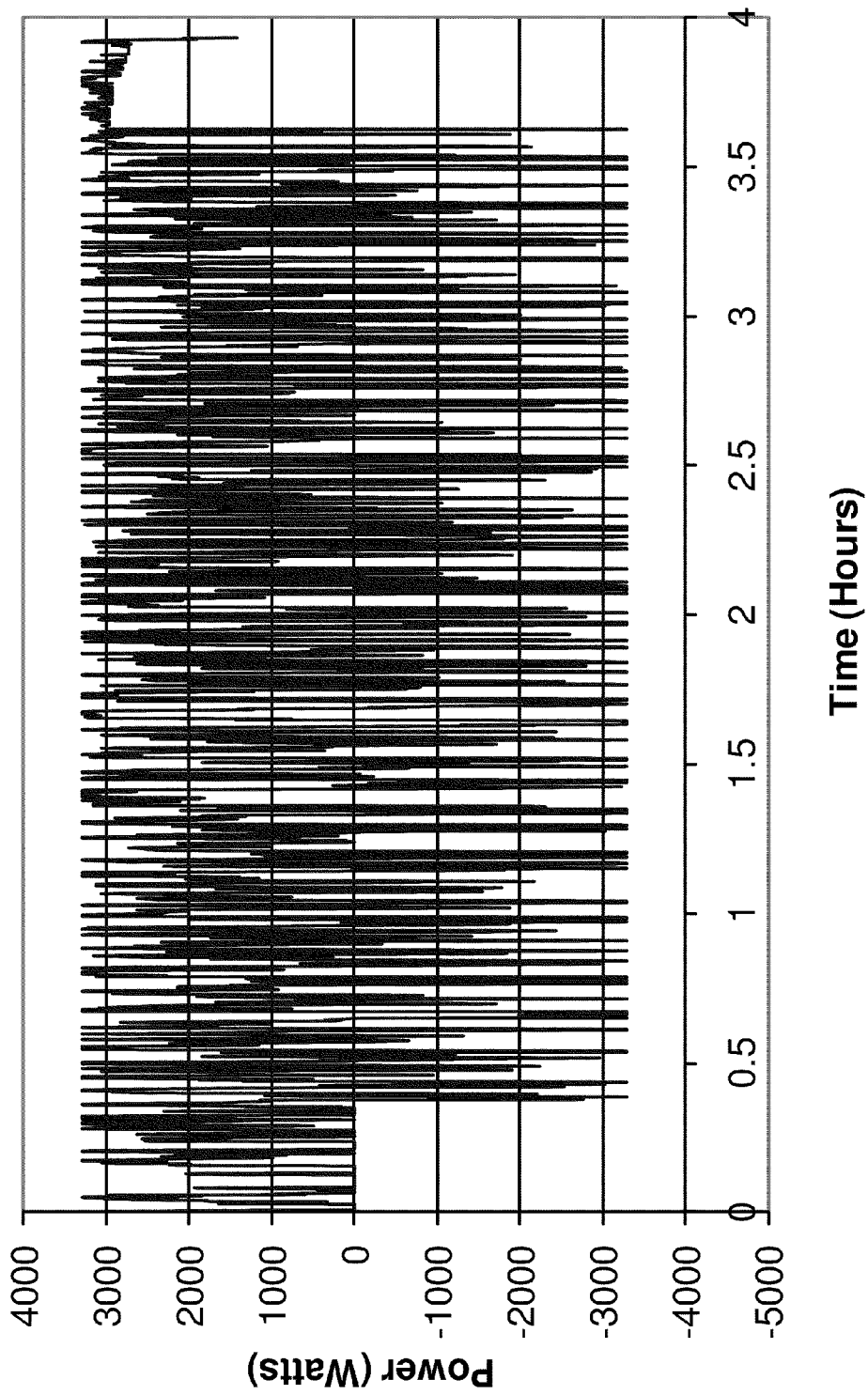
FIG. 11A is a graph showing power output of a charger vs. time for an embodiment of the disclosed technology.

FIG. 11A is a graph showing an exemplary power output response over time for a bi-directional charger in accordance with the disclosed technology. The parameters used in this example, which uses a PHEV as an energy storage device are, shown in Table 1.

TABLE 1

Example System Parameters

| | |
|---|---|
| 3.3 | kW max charge rate (220 Volt, 15 Amp) |
| 3.3 | kW max discharge rate (220 Volt, 15 Amp) |
| 20.0 | Ah battery size |
| 11.33% | initial state-of-charge |
| 20.0% | state of charge limit for discharge capabilities |
| 0.90 | critical time ratio |
| 98% | charging efficiency |
| 128 | second frequency averaging and minimum/maximum period |
| 4 | hour charging period |

As shown, the power output of the bi-directional charger varies from a maximum of 3.3 kW (full charging from electric power distribution system to energy storage device) to a minimum of −3.3 kW (full discharging from energy storage device to electric power distribution system). The lack of discharge during the first 20 minutes is attributed to the battery's initial state of charge being 11% and therefore below a predetermined threshold of 20% state-of-charge for full regulation services. As shown, the power output of the charger device varies between full charging and full discharging, before staying near maximum charger output toward the end of the charging period (after approximately 3.7 hours) in order to fully charge the battery by the end of the charging period.

Figure 11B:
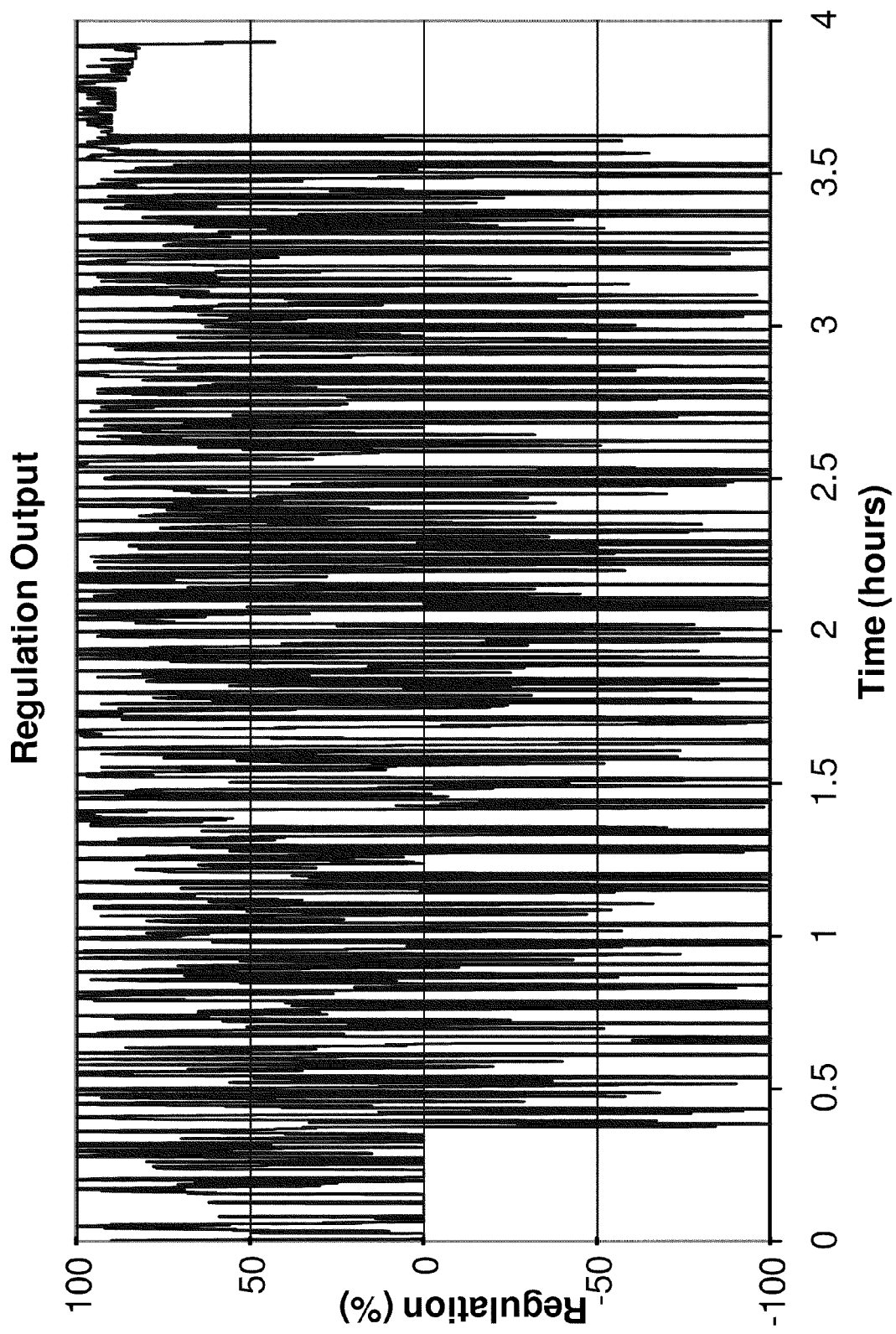
FIG. 11B is a graph showing regulation output of a charger vs. time for an embodiment of the disclosed technology.

FIG. 11B is a graph showing an exemplary regulation output response over time for a bi-directional charger in accordance with the disclosed technology. As shown, the regulation output is similar to the power output of the charger device as shown in FIG. 11A, but is on the nominal regulation output scale of −1.0 to +1.0.

FIG. 11C is a graph showing exemplary measured instantaneous and corresponding calculated average frequency information over time in accordance with the disclosed technology. As shown, the power grid frequency varies significantly, from over 60.03 Hz to less than 59.97 Hz. The average frequency shown is a trailing 128 time period average of the instantaneous frequency.

Figure 11D:
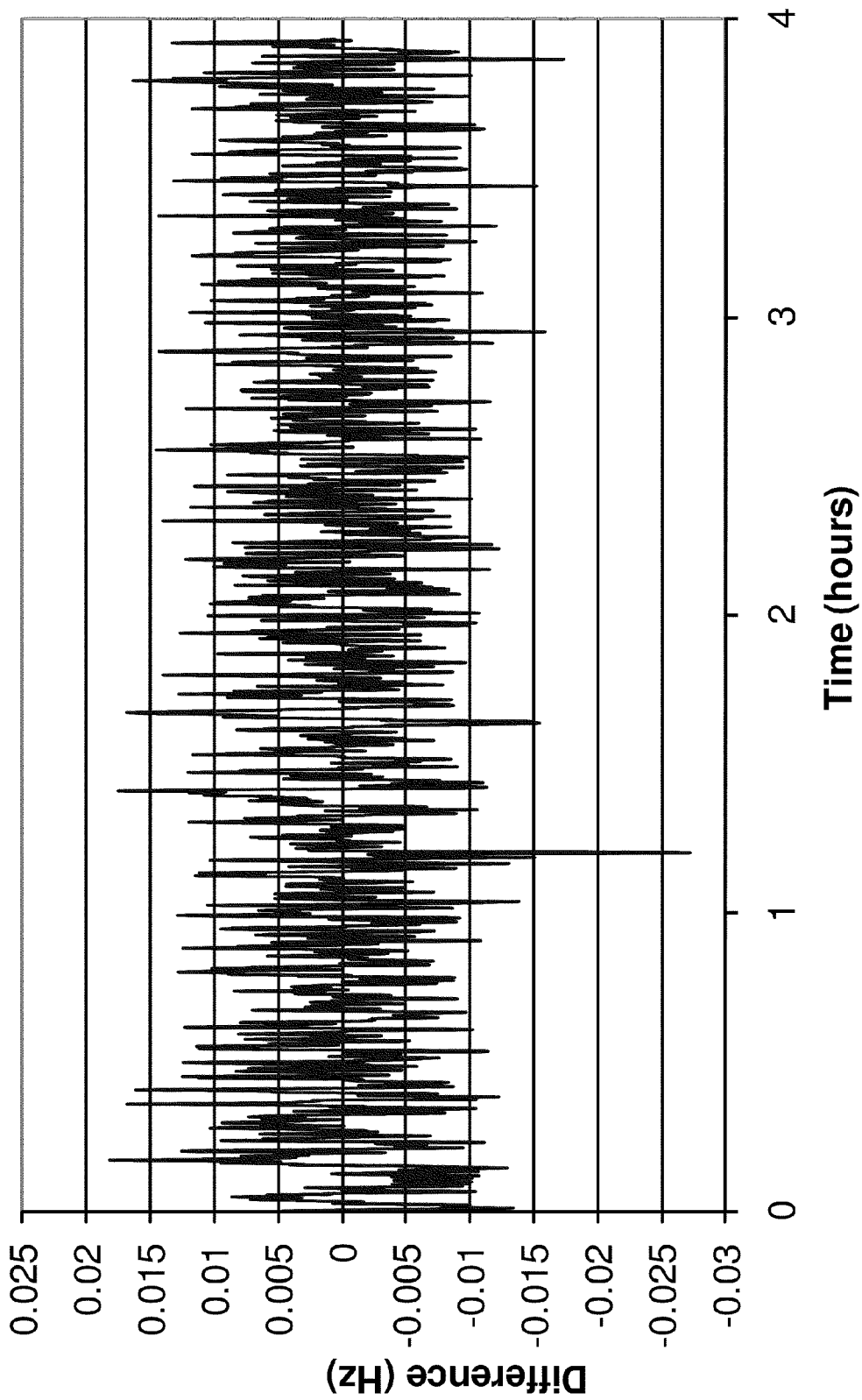
FIG. 11D is a graph showing the difference between instantaneous frequency and average frequency vs. time for an embodiment of the disclosed technology.

FIG. 11D is a graph showing an exemplary difference between the instantaneous and average frequency over time for a bi-directional charger in accordance with the disclosed technology. As shown, the difference reflects the difference between the two lines for instantaneous and average frequency shown in FIG. 11C.

Figure 11E:
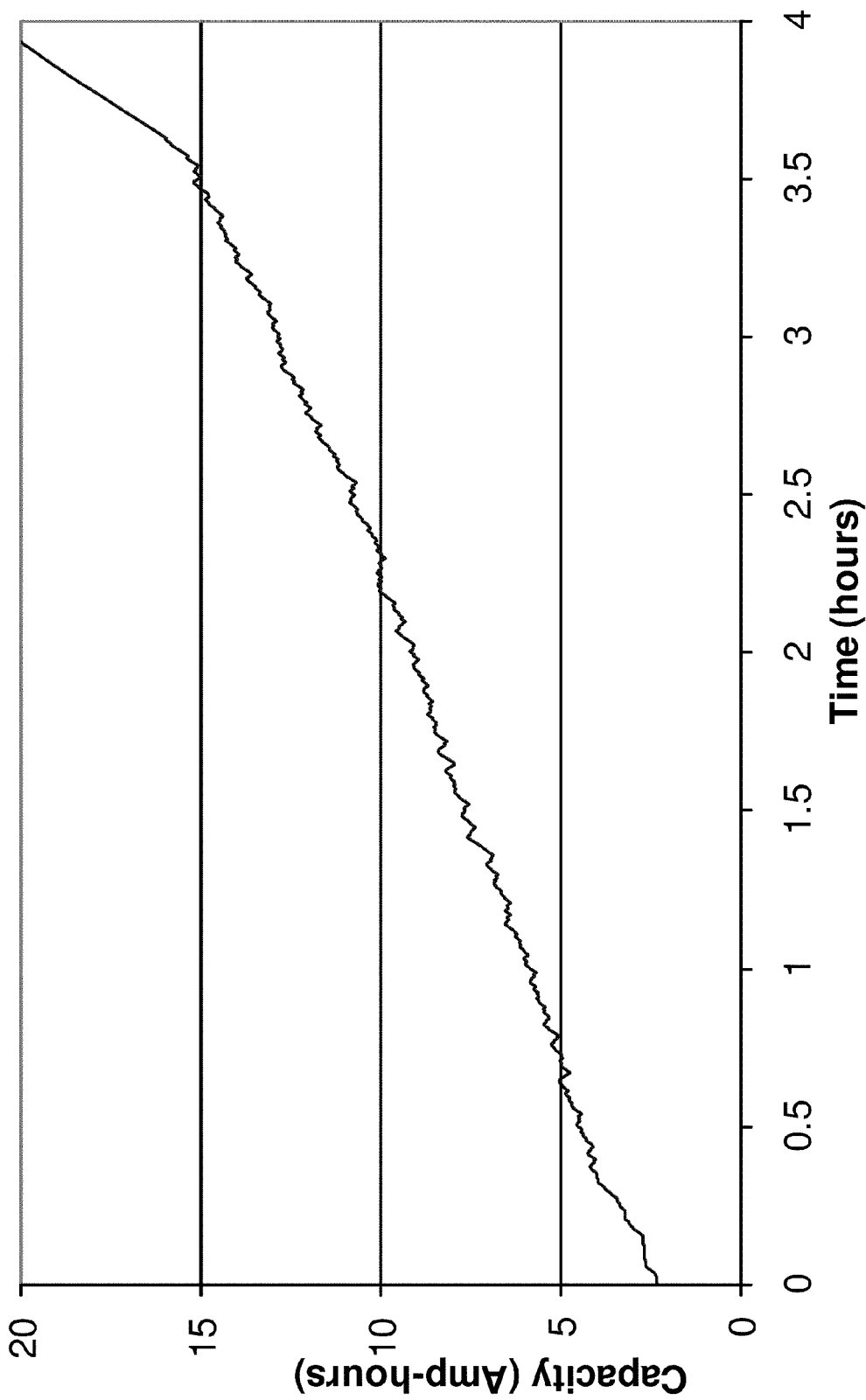
FIG. 11E is a graph showing battery capacity vs. time for an embodiment of the disclosed technology.

FIG. 11E is a graph showing an exemplary charged battery capacity response over time for a bi-directional charger in accordance with the disclosed technology. As shown, starting at a time of zero hours, the battery capacity monotonically approaches approximately 4 Amp-Hours, because the controller does not allow the battery to discharge when at a state of less than 20% SOC (corresponding to a battery capacity of 4 Amp-Hours). Between 0.4 hours and 3.7 hours, the battery charged capacity increases and decreases depending on whether the battery is being charged or discharged, but tends to approach 20 Amp-Hours. Finally, after 3.7 hours, the battery monotonically approaches 20 Amp-Hours in order to meet the time constraint of a 4.0 hour charging period.

Figure 11F:
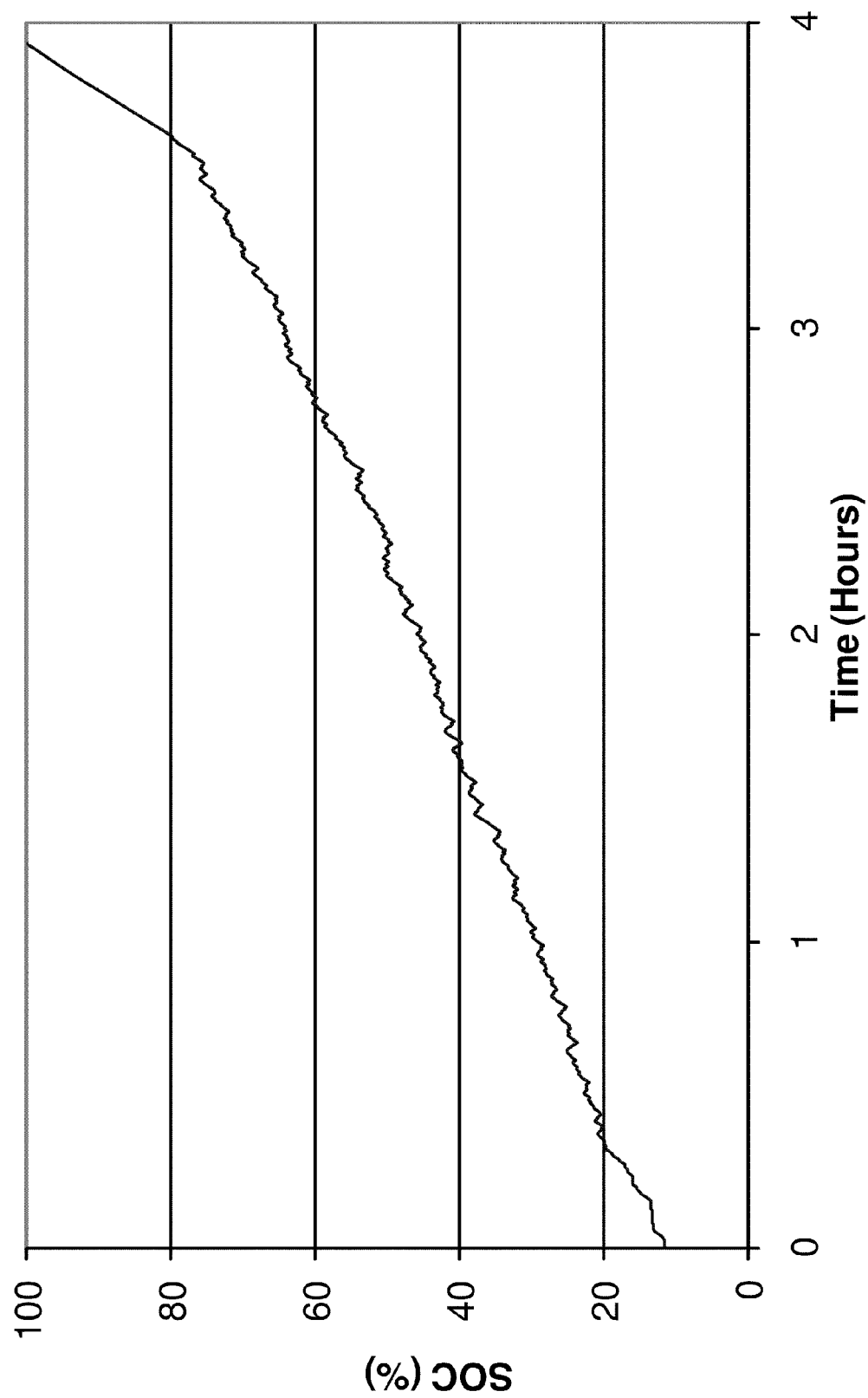
FIG. 11F is a graph showing battery State-of-Charge (SOC) vs. time for an embodiment of the disclosed technology.

FIG. 11F is a graph showing an SOC response over time for a battery system being charged by a bi-directional charger in accordance with the disclosed technology. As shown, starting at a time of zero hours, the battery SOC monotonically approaches 20% SOC, because the controller does not allow the battery to discharge when at a state of less than 20% SOC. Between 0.4 hours and 3.7 hours, the battery SOC increases and decreases depending on whether the battery is being charged or discharged, but tends to approach 100% SOC. Finally, after 3.7 hours, the battery monotonically approaches 100% SOC in order to meet the time constraint of a 4.0 hour charging period.

FIG. 11G is a graph showing an exemplary average charging rate response over time for a bi-directional charger in accordance with the disclosed technology. As shown, the average charging rate varies between approximately −7 amps up to approximately 15 amps. As the charging period nears the end, the average charging rate stays above 10 amps. As shown, the average charge rate is predominately positive, in part because of the limited time constraint to complete charging (4 hours).

Example source code for implementing embodiments of the methods described above using a controller is included in the ASCII file named "appendix.txt," submitted herewith via EFS, that includes computer program listings labeled Appendix A and Appendix B, which are so labeled within the ASCII file. Appendix A is source code in the C programming language for simulating a grid regulation function according to the techniques disclosed herein including reading a file including frequency information for a electric power grid and writing a file containing values of parameters and output charge rates, including the output rate, the percentage of charger output, battery SOC, battery charge rate in amps, average battery charge rate, instantaneous frequency, average frequency, and frequency differential according to the disclosed technology. Appendix B is source code in the C programming language that implements a grid regulation function according to the techniques disclosed herein including generating a bi-directional charger regulation signal.

Figure 12:
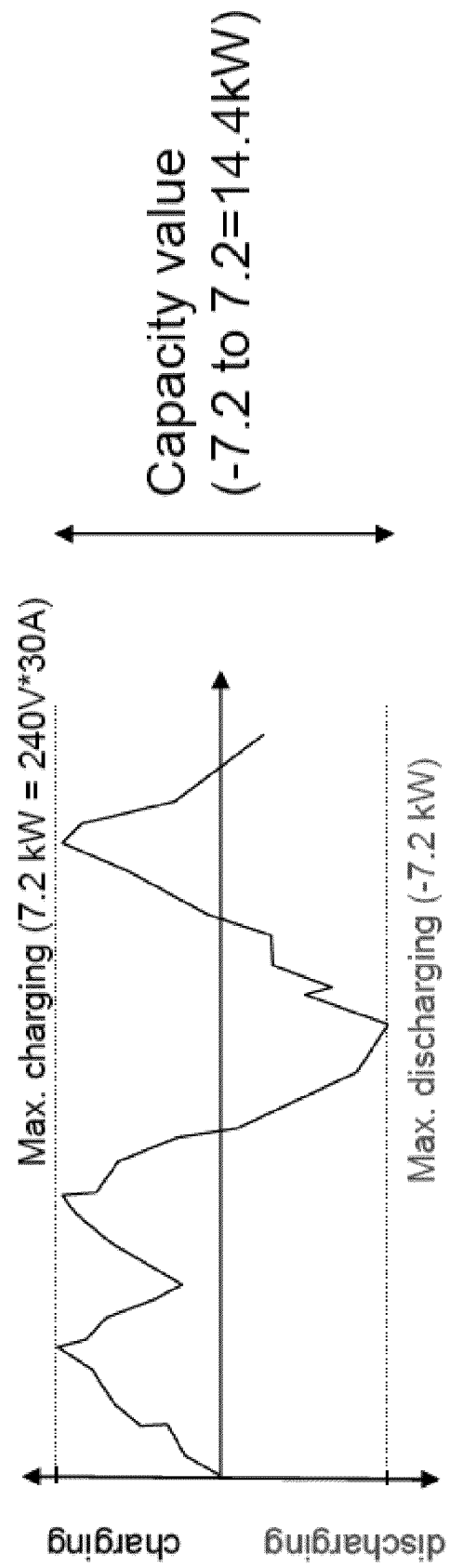
FIG. 12 is a graph showing power output of a charger vs. time for an embodiment of the disclosed technology.

FIG. 12 is a graph showing an exemplary power output response over time for a charger device when performing a method of selecting a charge rate output in response to receiving data representing electrical characteristics of an electric power distribution system. As shown, the maximum charger output is limited to a maximum of 7.2 kW and a maximum discharge of −7.2 kW. The maximum charging rate is determined by the maximum current that the charger can supply and/or that the energy storage device can accept (as shown, 30 amps at a voltage of 240V). The power output response over time has been damped, in contrast to the power output response of FIGS. 11A-F, in order to provide smoother charger output with less variation.

Having described and illustrated the principles of the disclosed technology in the detailed description and accompanying drawings, it will be recognized that the various embodiments can be modified in arrangement and detail without departing from such principles. For example, the disclosed technology can be used in connection with any of the embodiments described in U.S. Pat. No. 7,149,605, which was filed Jun. 13, 2003 and is entitled "Electrical Power Distribution Control Methods, Electrical Energy Demand Monitoring Methods, and Power Management Devices," U.S. Pat. No. 7,010,363, which was filed Jun. 13, 2003, and is entitled "Electrical Appliance Energy Consumption Control Methods and Electrical Energy Consumption Systems," and U.S. patent application Ser. No. 12/467,192, which was filed May 15, 2009, and is entitled "Battery Charging Control Methods, Electric Vehicle Charging Methods, Battery Charging Apparatuses and Rechargeable Battery Systems," all three of which are hereby incorporated herein in their entirety. It should be understood that the programs, processes, or methods described herein are not related or limited to any particular type of computing or hardware environment, unless indicated otherwise. Various types of general purpose or specialized hardware environments can be used with or to perform operations in accordance with the teachings described herein.

In view of the many possible embodiments to which the principles of the disclosed technology can be applied, it should be recognized that the illustrated embodiments are only examples of the disclosed technology and should not be taken as a limitation on the scope of the disclosed technology. Rather, the scope of the disclosed technology is defined by the following claims and their equivalents. We therefore claim all that comes within the scope and spirit of these claims and their equivalents.

We claim:

1. A system, comprising:
one or more processing units;
one or more non-transitory computer-readable storage media storing computer-readable instructions that when executed by the processing units determine a charging rate for a bi-directional charger using:
a logic module operable to determine the charging rate for the bi-directional charger using data representing one or more electrical characteristics of an electrical power distribution system, to maintain the determined charging rate below an upper charge limit and above a lower charge rate limit, and to select each of the respective charge limits based on an average charge rate of the bi-directional charger for a preceding time period; and
a data output module operable to send charger output rate data representing the determined charging rate.

2. The system of claim 1, wherein the data includes frequency data representing an instantaneous frequency of the electrical power distribution system.

3. The system of claim 1, wherein the charging rate of the bi-directional charger is negative.

4. The system of claim 1, wherein the charging rate of the bi-directional charger indicates that the bi-directional charger is to discharge.

5. The system of claim 1, further comprising the bi-directional charger, the bi-directional charger being configured to receive power from or deliver power to the electrical power distribution system in response to the charger output rate data.

6. The system of claim 1, wherein the charging rate is based at least in part on one or more of: status data representing the status of an energy storage device, time data representing a desired final charging time, or an actual charging or discharging rate of the energy storage device.

7. The system of claim 1, wherein the data input module is operable to receive an upper frequency parameter defining an over-frequency event of the electrical power distribution system, a lower frequency parameter defining an under-frequency event of the electrical power distribution system, or both the upper frequency parameter and the lower frequency parameter, and wherein the determining is based at least in part on one or more of the upper frequency parameter and the lower frequency parameter.

8. The system of claim 1, further comprising an energy storage device operable to generate power in the electrical power distribution system responsive to the charger output rate data.

9. A method, comprising:
determining an initial charging rate for a bi-directional charger based on data representing one or more electrical characteristics of an electrical power distribution system, the electrical characteristic data including frequency data representing one or more frequency measurements of the electrical power distribution system;
adjusting the charging rate to remain within a range of charge limits, the range of charge limits being selected based on actual charge rate data for the bi-directional charger for a preceding time period, and the range of charge limits including charging rates that discharge an energy storage device coupled to the bi-directional charger; and
sending charger output rate data representing the adjusted charging rate to the bi-directional charger, the charger output rate data indicating a rate at which to charge or discharge the energy storage device.

10. The method of claim 9, further comprising charging the energy storage device within a desired charging time.

11. The method of claim 9, wherein the electrical characteristic data includes frequency data representing an instantaneous frequency measurement of the electrical power distribution system.

12. The method of claim 11, further comprising computing an average frequency from the frequency data.

13. The method of claim 9, wherein the electrical characteristic data includes frequency data representing an instantaneous frequency of the electrical power distribution system and an average frequency of the electrical power distribution system.

14. The method of claim 9, wherein the charger output rate data indicates a rate at which to discharge the energy storage device.

15. The method of claim 9, further comprising receiving status data representing the status of the energy storage device, and wherein the adjusting the charging rate is based, at least in part, on the status data.

16. The method of claim 15, wherein the status data includes data representing a state-of-charge of the energy storage device.

17. The method of claim 9, further comprising receiving an upper frequency parameter defining an over-frequency event of the electrical power distribution system, a lower frequency parameter defining an under-frequency event of the electrical power distribution system, and wherein the adjusting the charging rate is based at least in part on one or more of the upper frequency parameter and the lower frequency parameter.

18. The method of claim 9, wherein the actual charge rate data indicates an actual charging or discharging rate of the energy storage device.

19. The method of claim 9, further comprising discharging the energy storage device responsive to the charger output rate data, thereby transmitting power to the electrical power distribution system.

20. The method of claim 9, wherein the energy storage device comprises at least one or more of the following: a battery in an electric vehicle, a battery in a plug-in hybrid electric vehicle, a stationary power source, pumped water storage, a flywheel, or a photovoltaic power system.

21. The method of claim 9, wherein the electrical power distribution system includes an alternating current power supply.

22. The method of claim 9, wherein the electrical characteristic data includes voltage data representing an operating voltage of the electrical power distribution system.

23. The method of claim 9, wherein the bi-directional charging system includes an AC-to-DC battery charger and a DC-to-AC grid-tie inverter.

24. The method of claim 9, wherein the adjusting the charging rate comprising clamping the charging rate below a first selected charging rate or above a second selected charging rate, and wherein the first and second selected charging rates are selected in response to a pre-determined or user-selected completion time for charging the energy storage device.

25. One or more non-transitory computer-readable storage media storing computer-readable instructions that when executed by one or more processing units cause a computer to perform a method, the method comprising:
    determining an initial charging rate for a bi-directional charger based on data representing one or more electrical characteristics of an electrical power distribution system, the electrical characteristic data including frequency data representing one or more frequency measurements of the electrical power distribution system;
    adjusting the charging rate to remain within a range of charge limits, the range of charge limits being selected using the instructions based on actual charge rate data for the bi-directional charger for a preceding time period, and the range of charge limits including charging rates that discharge an energy storage device coupled to the bi-directional charger; and
    sending charger output rate data representing the adjusted charging rate to the bi-directional charger, the charger output rate data indicating a rate at which to charge or discharge the energy storage device.

26. The non-transitory computer-readable storage media of claim 25, wherein the method further comprises computing an average frequency from the frequency data.

27. The non-transitory computer-readable storage media of claim 25, wherein the electrical characteristic data includes frequency data representing an instantaneous frequency of the electrical power distribution system and an average frequency of the electrical power distribution system.

28. The non-transitory computer-readable storage media of claim 25, wherein the charger output rate data indicates a rate at which to discharge the energy storage device.

29. The non-transitory computer-readable storage media of claim 25, further comprising receiving status data representing the status of the energy storage device, and wherein the adjusting the charging rate is based, at least in part, on the status data.

30. The non-transitory computer-readable storage media of claim 29, wherein the status data includes data representing a state-of-charge of the energy storage device.

31. The non-transitory computer-readable storage media of claim 25, wherein the method further comprises receiving an upper frequency parameter defining an over-frequency event of the electrical power distribution system, a lower frequency parameter defining an under-frequency event of the electrical power distribution system, and wherein the adjusting the charging rate is based at least in part on one or more of the upper frequency parameter and the lower frequency parameter.

32. The non-transitory computer-readable storage media of claim 25, wherein the actual charge rate data indicates an actual charging or discharging rate of the energy storage device.

33. The non-transitory computer-readable storage media of claim 25, wherein the method further comprises discharging the energy storage device responsive to the charger output rate data, thereby transmitting power to the electrical power distribution system.

34. The non-transitory computer-readable storage media of claim 25, wherein the adjusting the charging rate comprising clamping the charging rate below a first selected charging rate or above a second selected charging rate, and wherein the first and second selected charging rates are selected in response to a pre-determined or user-selected completion time for charging the energy storage device.

35. A system, comprising:
    one or more processing units;
    an interface to a bi-directional charger, the bi-directional charger configured to charge or discharge an energy storage device based on charger output rate data; and
    one or more non-transitory computer-readable storage media storing computer-readable instructions that when executed by the one or more processing units cause the system to perform a method, the method comprising:
        determining an initial charging rate for a bi-directional charger based on data representing one or more electrical characteristics of an electrical power distribution system, the electrical characteristic data including frequency data representing one or more frequency measurements of the electrical power distribution system;
        adjusting the charging rate to remain within a range of charge limits, the range of charge limits being selected using the instructions based on actual charge rate data for the bi-directional charger for a preceding time period, and the range of charge limits including charging rates that discharge an energy storage device coupled to the bi-directional charger; and
        using the interface, sending charger output rate data representing the adjusted charging rate to the bi-directional charger, the charger output rate data indicating a rate at which to charge or discharge the energy storage device.

36. The system of claim 35, wherein the method further comprises computing an average frequency from the frequency data.

37. The system of claim 35, wherein the electrical characteristic data includes frequency data representing an instantaneous frequency of the electrical power distribution system and an average frequency of the electrical power distribution system.

38. The system of claim 35, wherein the charger output rate data indicates a rate at which to discharge the energy storage device.

39. The system of claim 35, further comprising receiving status data representing the status of the energy storage device, and wherein the adjusting the charging rate is based, at least in part, on the status data.

40. The system of claim 35, wherein the method further comprises receiving an upper frequency parameter defining an over-frequency event of the electrical power distribution system, a lower frequency parameter defining an under-frequency event of the electrical power distribution system, and wherein the adjusting the charging rate is based at least in part on one or more of the upper frequency parameter and the lower frequency parameter.

41. The system of claim 35, wherein the method further comprises discharging the energy storage device responsive to the charger output rate data, thereby transmitting power to the electrical power distribution system.

42. The system of claim 35, wherein the adjusting the charging rate comprising clamping the charging rate below a first selected charging rate or above a second selected charging rate, and wherein the first and second selected charging rates are selected in response to a pre-determined or user-selected completion time for charging the energy storage device.

43. A method, comprising:
    determining a charging rate for a bi-directional charger using data representing one or more electrical characteristics of an electrical power distribution system, maintaining the determined charging rate below an upper charge limit and above a lower charge rate limit, each of the respective charge limits being selected based on an average charge rate of the bi-directional charger for a preceding time period; and sending the charger output rate data representing the determined charging rate to the bi-directional charger.

44. The method of claim 43, wherein the data includes frequency data representing an instantaneous frequency of the electrical power distribution system.

45. The method of claim 43, wherein the charging rate of the bi-directional charger indicates that the bi-directional charger is to discharge.

46. The method of claim 43, wherein the charging rate is determined based at least in part on one or more of: status data representing the status of an energy storage device, time data representing a desired final charging time, or an actual charging or discharging rate of the energy storage device.

47. The method of claim 43, further transmitting power to the electrical power distribution system responsive to the charger output rate data.

48. One or more non-transitory computer-readable storage media storing computer-readable instructions that when executed by a computer determine a charging rate for a bi-directional charger, the method comprising:

determining a charging rate for a bi-directional charger using data representing one or more electrical characteristics of an electrical power distribution system, maintaining the determined charging rate below an upper charge limit and above a lower charge rate limit, each of the respective charge limits being selected using the instructions based on an average charge rate of the bi-directional charger for a preceding time period; and sending the charger output rate data representing the determined charging rate to the bi-directional charger.

49. The computer-readable storage media of claim 48, wherein the data includes frequency data representing an instantaneous frequency of the electrical power distribution system.

50. The computer-readable storage media of claim 48, wherein the charging rate is determined based at least in part on one or more of: status data representing the status of an energy storage device, time data representing a desired final charging time, or an actual charging or discharging rate of the energy storage device.

* * * * *